US008654189B1

(12) United States Patent
Spangler et al.

(10) Patent No.: US 8,654,189 B1
(45) Date of Patent: Feb. 18, 2014

(54) ANCHOR SURVEILLANCE FOR MARITIME VESSELS

(75) Inventors: Jonathan David Spangler, Del Mar, CA (US); Wayne Elbert Spangler, Rice Lake, WI (US)

(73) Assignee: Jonathan Spangler, Del Mar, CA (US)

( * ) Notice: Subject to any disclaimer, the term of this patent is extended or adjusted under 35 U.S.C. 154(b) by 0 days.

(21) Appl. No.: 13/449,674

(22) Filed: Apr. 18, 2012

Related U.S. Application Data

(60) Provisional application No. 61/476,577, filed on Apr. 18, 2011.

(51) Int. Cl.
*H04N 9/47* (2006.01)
(52) U.S. Cl.
USPC .......................................................... 348/81
(58) Field of Classification Search
USPC ............................... 348/81; 340/991; 114/179
See application file for complete search history.

(56) References Cited

U.S. PATENT DOCUMENTS

| | | | | |
|---|---|---|---|---|
| 2,679,225 A | * | 5/1954 | Heleba | 114/179 |
| 3,014,984 A | * | 12/1961 | Jacobson | 348/81 |
| 4,045,813 A | | 8/1977 | Jones | |
| 4,281,343 A | | 7/1981 | Monteiro | |
| 4,485,398 A | * | 11/1984 | Chapin et al. | 348/81 |
| 4,916,471 A | | 4/1990 | Tussey | |
| 5,305,030 A | | 4/1994 | Yokoyama | |
| 5,778,259 A | | 7/1998 | Rink | |
| 6,020,918 A | | 2/2000 | Murphy | |
| 6,057,879 A | * | 5/2000 | Weber | 348/81 |
| 6,100,921 A | * | 8/2000 | Rowley | 348/81 |
| 6,262,761 B1 | * | 7/2001 | Zernov et al. | 348/81 |
| 6,352,389 B1 | | 3/2002 | Rines | |
| 6,525,762 B1 | | 2/2003 | Mileski | |
| 6,680,795 B2 | | 1/2004 | Chezar | |
| 6,724,986 B1 | | 4/2004 | Sicher | |
| 6,909,845 B1 | | 6/2005 | Schillinger | |
| 7,290,496 B2 | | 11/2007 | Asfar | |
| 7,684,694 B2 | | 3/2010 | Fromm | |
| 2003/0174206 A1 | | 9/2003 | Moroz | |
| 2004/0160513 A1 | | 8/2004 | Kilmer | |
| 2006/0008137 A1 | | 1/2006 | Nagahdaripour | |
| 2008/0062269 A1 | | 3/2008 | Omer | |
| 2008/0088485 A1 | * | 4/2008 | Stolte et al. | 340/991 |
| 2008/0148621 A1 | | 6/2008 | Laser | |
| 2009/0128623 A1 | | 5/2009 | Whittle | |

OTHER PUBLICATIONS

Remote Ocean Systems, "Anchor Bolster Video Monitoring System", Product Brochure, Publication Date Unknown, San Diego, CA.
Remote Ocean Systems, "PTZ-1000 System in HD—Pan/Tilt, Zoom and Lights System", Product Brochure, Publication Date Unknown, San Diego, CA.

* cited by examiner

*Primary Examiner* — Gims Philippe
(74) *Attorney, Agent, or Firm* — Jonathan Spangler

(57) ABSTRACT

Anchor surveillance for maritime vessels involving the use of an underwater video camera and a remote video display to enable indirect inspection of an anchor during and/or after the process of deploying and/or setting the anchor. The remote video display may be on and/or off the maritime vessel and may comprise a software application ("app") on a smartphone and/or computer tablet to help control some or all of the anchor surveillance system.

19 Claims, 32 Drawing Sheets

ANCHOR SURVEILLANCE FOR MARITIME VESSELS

CROSS REFERENCES TO RELATED APPLICATIONS

The present application is a non-provisional patent application claiming benefit under 35 U.S.C. §119(e) from U.S. Provisional Application Ser. No. 61/476,577, filed on Apr. 18, 2011, the entire contents of which are hereby expressly incorporated by reference into this disclosure as if set forth fully herein.

BACKGROUND OF THE INVENTION

I. Field of the Invention

The present invention relates generally to anchoring maritime vessels and, more particularly, to anchor surveillance for maritime vessels involving underwater video surveillance.

II. Discussion of the Prior Art

Anchors have been used to secure sailing vessels for hundreds if not thousands of years, and more recently for powered maritime vessels such as motor yachts, cruise ships, and fishing boats. A major challenge in anchoring such maritime vessels is ensuring the anchor has adequate purchase in the sea or lake floor to withstand the various forces acting upon the vessel, such as wind and water, and thus maintain the vessel in a safe and secure state in the given anchored location. Without adequate and sustained anchor purchase, the vessel may slide and move from the given anchored location into other vessels, out to sea, or into the shoreline. In any such case, the unwanted movement of the vessel may cause significant damage if not out-and-out catastrophe for the vessel and potential loss of life for the occupants of the vessel, occupants of nearby vessels, and those on shore.

The present invention is directed at addressing this long-felt challenge to improve the ability to safely and securely anchor maritime vessels.

SUMMARY OF THE INVENTION

The present invention accomplishes this goal by providing anchor surveillance involving underwater video monitoring during and/or after deployment of an anchor to ensure adequate anchor purchase to safely and securely maintain a maritime vessel in a given anchor location. The anchor surveillance of the present invention includes a video camera system capable of capturing video images of an anchor and transmitting them to a remote video display. The video camera system may be coupled directly or indirectly to the anchor and/or anchor rode. The remote video display may be located on the maritime vessel itself and/or a location other than the maritime vessel. Communication of the video images between the video camera system and the remote video display may be accomplished via hard-wire (cables) and/or wireless technology. The video images provide the ability to perform indirect visual inspection of an anchor and/or anchor rode to ensure proper purchase in the sea or lake floor. In so doing, the anchor surveillance of the present invention avoids the need to perform direct visual inspection, which involves physically diving to the anchor to view in person. More importantly, the anchor surveillance of the present invention provides a manner of inspecting an anchor when direct inspection is not desired and/or possible (e.g. during inclement and/or dangerous conditions).

If upon review by an occupant of the vessel the video images are deemed inadequate or otherwise of concern, the anchor may be raised and re-deployed or simply re-set without raising by causing the maritime vessel to move and thus drive the anchor into the sea or lake floor from the previously unset location. Importantly, the occupant(s) of the vessel need not guess as to whether the anchor has been adequately set, and thereby risk having the vessel move in an undesirable and/or unsafe manner. Moreover, an occupant of the vessel need not physically venture into the water in order to directly assess the purchase of the anchor, thereby removing attendant risks of doing so, particularly in inclement or otherwise unsafe conditions (e.g. heavy seas, current, rain, darkness, sharks, etc. . . . ).

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The anchor surveillance systems and related methods disclosed herein boast a variety of inventive features and components that warrant patent protection, both individually and in combination.

Figure 1:
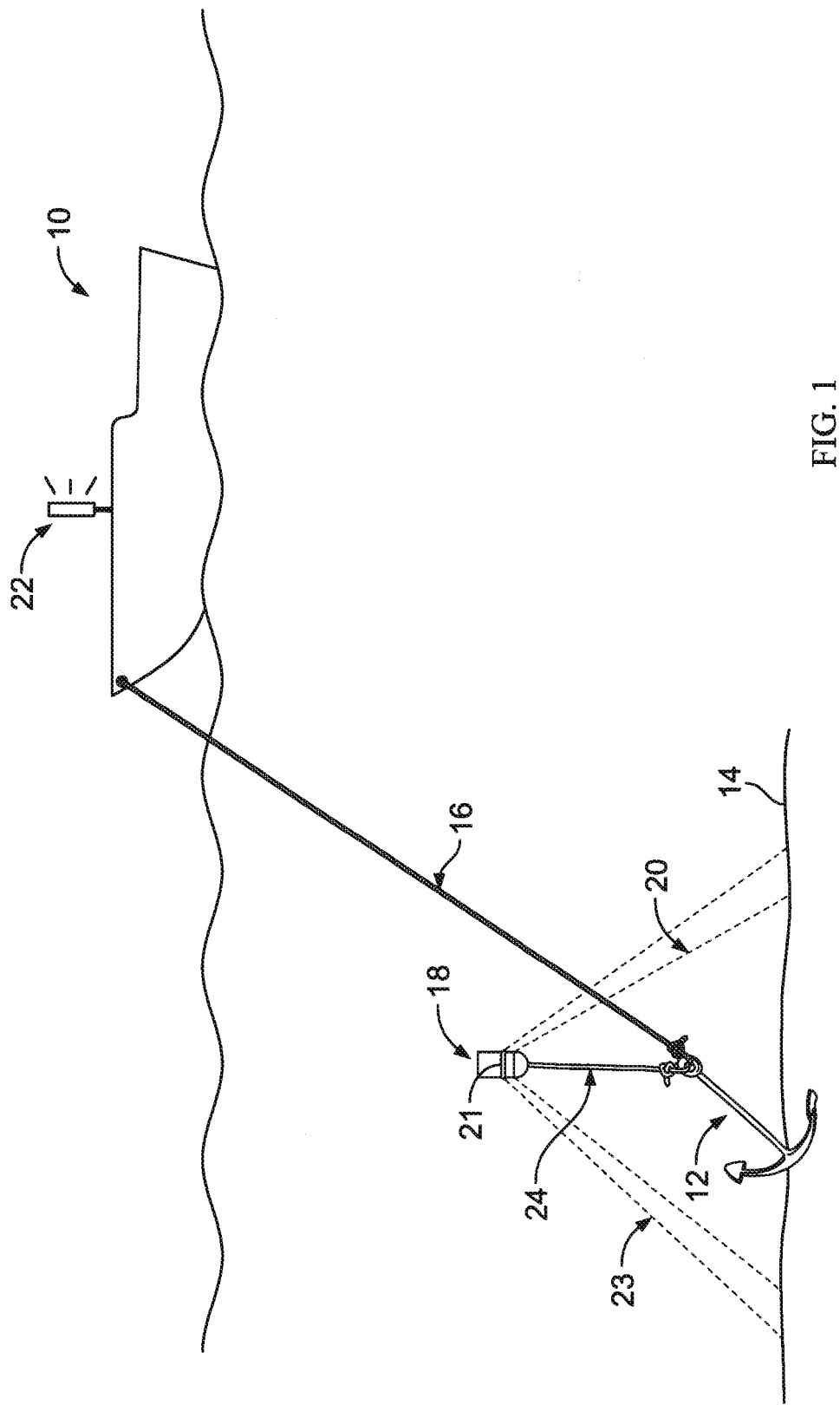
FIG. 1 is a partial side view of a maritime vessel at anchor with anchor surveillance according to an aspect of the present invention, with a floating video camera system coupled indirectly to an anchor.
Figure 2:
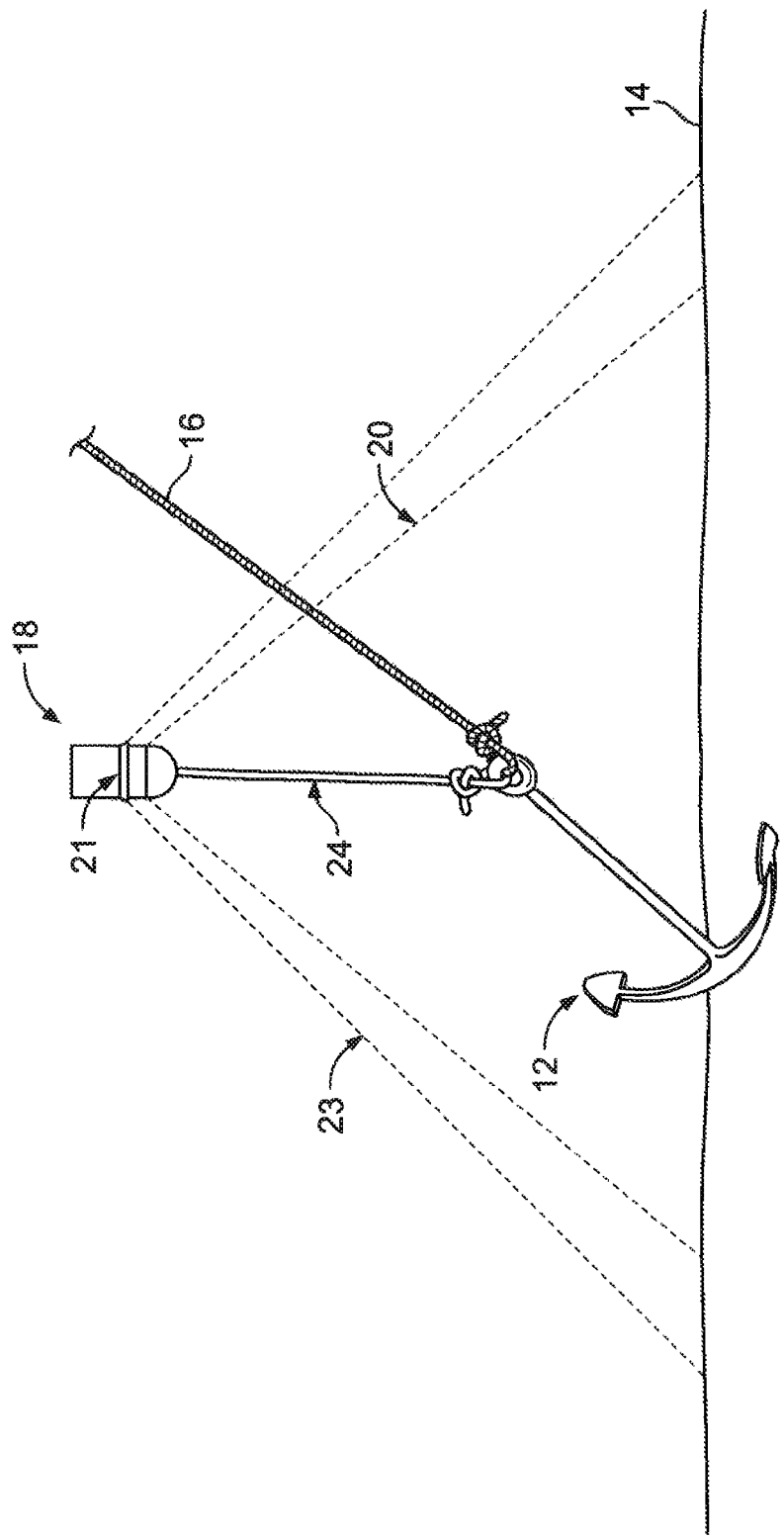
FIG. 2 is an enlarged side view of a floating video camera system of the type shown in FIG. 1, illustrating the field of view of the video camera (inner dashed cone) and the field of illumination of an optional light source (outer dashed cone)

FIG. 1 illustrates a maritime vessel 10 having an anchor 12 deployed and set in the sea or lake floor 14 and coupled to the vessel 10 via an anchor rode 16. According to one aspect of the present invention, a floating video camera system 18 is coupled directly to the anchor 12 via a tether 24, in this instance at or near the proximal end which is attached to the anchor rode 16. With reference to FIGS. 1-2, the video camera system 18 has a field of view 20 (shown in dotted lines) sufficient to capture video images which are suitable upon transmission to a remote video display 22 for a user to assess the physical condition and/or position of the anchor 12 (e.g. to ensure the anchor 12 has an adequate purchase in the sea or lake floor 14). The video camera system 18 may also include a light source 21 to provide a field of illumination 23 (shown in dotted lines) to augment or improve the ability to obtain suitable video images, particularly at night and/or if otherwise hard to visualize (e.g. murky water, deep water, etc. . . . ). The video images may be transmitted to the remote video display 22 in any number of suitable manners, including but not limited to hard-wired communication (e.g. via cables, not shown) and/or wireless communication between the video camera system 18 and remote video display 22.

Although shown generically, the maritime vessel 10 is any floating vessel designed to transport people and/or goods by moving the vessel from one point to another. Such floating transport vessels may include, but are not necessarily limited to, a sailboat, a power boat, a combination power/sail boat, a cruise ship, a container ship, and a barge. Although shown as a classic "kedge" type in FIG. 1, the anchor 12 may be any suitable type, including but not limited to a Plow, Danforth, Byers, Hall, Union, D'Hone, ZY-6, AC14, Pool, Bruce, Spek, Stockless, FOB, Klip, CQR, Navy Stockless, and Mushroom, without departing from the scope of the present invention. The anchor rode 16 may be any suitable material for securing the vessel 10 to the anchor 12, including but not limited to a chain, a rope, a combination of chain and rope, cable, etc. . . . The anchor rode 16 is shown in a relatively taut condition, with a relatively high slope and not touching the bottom 14, which may occur while setting the anchor 12 and/or under high winds and/or high current acting upon the maritime vessel 10. Although not shown, it will be appreciated that in the absence of those conditions the anchor rode 16 will typically rest upon the bottom 14 in the vicinity of the anchor 12 before ascending to the maritime vessel 10.

The remote video display 22 may be located anywhere suitable for the occupant(s) of the maritime vessel 10 to perform anchor monitoring depending on their location and desire to perform anchor-monitoring at that location. For example, an occupant may desire to view video images of the anchor 12 during the anchoring process to determine whether the anchor 12 is positioned properly upon deployment and/or during the setting process. "Deployment" describes the process of lowering the anchor 12 to the floor 14 and letting out an appropriate length of anchor rode 16 to achieve a desired scope (i.e. angle of anchor rode 16 between floor 14 and the vessel 10), while "setting" describes the process of dragging the anchor 12 across the floor 14 with sufficient force to drive the purchase element(s) of the anchor 12 to dig into the floor 14 and obtain sufficient purchase to securely maintain the vessel 10 in the desired location.

In either event, the remote video display 22 may be located in the cockpit or elsewhere "above deck" (as shown generally in FIG. 1) such that the occupant can watch the video display 22 during the anchoring process. (Although not shown, other specific "above deck" locations may include, but are not necessarily limited to, the steering pedestal in the cockpit, in or on the cockpit cowling, at or near the bow, at or new the stern, on the mast, boom, etc. . . . ). In this manner, an occupant may contemporaneously determine whether the anchor 12 is positioned to dig and/or is digging into the floor 14 to achieve the desired purchase or, conversely, whether the anchor 12 is fouled up with the anchor rode 16 or other elements on the floor 14 (e.g. rocks, other anchors, etc. . . . ) such that the anchor 12 isn't likely to dig into the floor 14 to establish the desired purchase. If anything other than a desired purchase is obtained, the anchor 12 may be redeployed and/or re-set as appropriate.

The remote video display 22 may also be located "below deck" on vessel 10, which may be particularly useful for monitoring the purchase of the anchor 12 after the anchoring process. Such "below deck" locations may include, but are not necessarily limited to, the navigation station, at or near any secondary steering stations other than in the cockpit (e.g. pilot house), in the stateroom(s), etc. . . . In any case, an occupant can periodically view the below-deck remote video display 22 after the anchoring process to assess the purchase of the anchor 12 and thereby ensure the continued anchor safety of the vessel 10. This may be particularly advantageous and convenient, for example, during inclement weather at night. Rather than go above-deck into the elements, an occupant may simply assess anchor purchase from the convenience and comfort of their below-deck position (e.g. stateroom) periodically throughout the night by viewing the remote video display 22 located below-deck. If a problem is encountered (e.g. the anchor 12 is dragging), only then will they need to go above-deck and redeploy or re-set the anchor 12 as appropriate.

In addition to the "on vessel" locations set forth by way of example above, the remote video display 22 may also be located "off vessel" in accordance with an aspect of the present invention. Such "off vessel" locations may be anywhere suitable for non-occupants to perform anchor monitoring depending on their location and desire to perform anchor-monitoring at that location. Examples of "off vessel" locations, include, but are not necessarily limited to, harbor-master and/or harbor-police stations (on shore and/or on vessels), the home(s) and/or office(s) of the owner of the maritime vessel, etc. . . . In any case, if upon review by a non-occupant the video images are indicative of an anchor problem (e.g. the anchor 12 is dragging) or otherwise of concern, remedial steps may be undertaken or commissioned by the non-occupant (e.g. harbor patrol, owner, etc. . . . ) to re-deployed or re-set the anchor to alleviate the anchor problem or concern.

Whether located on-vessel or off-vessel, the remote video display(s) 12 may take any suitable form according to the present invention. By way of example only, the remote video display 22 may be a dedicated video display device having no other function beyond displaying video information and/or a video display device which is integrated into or used with other instruments or systems. Examples of the latter include, but are not necessarily limited to, computers (e.g. laptops, desktops, etc. . . . ), televisions, chart-plotters, global positioning systems, radar systems, smart-phones (e.g. iPhone, Blackberry, Droid, etc. . . . ) and/or computer tablets (e.g. iPad, etc. . . . ). (As will be described below, if implemented using a smart-phone and/or computer tablet, such devices can be programmed with a software application (or "app") for controlling aspects of the anchor surveillance system in accordance with an aspect of the present invention.) If combined with a GPS system, the video surveillance system of the present invention may include any number of supplemental alarm features, such as sounding an alarm if the GPS system senses that the vessel 10 has moved more than a predetermined distance, which would be indicative of normal movement and/or swinging of the vessel 10.

The video camera system 18 may be of any suitable type, whether water-proof or within a water-proof housing, and may be equipped with any number of suitable features to improve or facilitate the capture of meaningful video images of the condition and/or position of the anchor 12 when transmitted to the remote video display 22 according to the present invention. The field of view 20 may be either pre-determined or adjustable in order to ensure an optimal perspective of the anchor 12. In the latter case, the field of view 20 may be adjusted remotely by a user (e.g. by an occupant of the vessel) during and/or after the anchoring process, adjusted manually (e.g. by an occupant of the vessel) before the anchor 12 the anchoring process, and/or adjusted automatically during and/or after the anchoring process without the need for user intervention. The view may be panoramic or any other manner (e.g. more focused) without departing from the scope of the present invention.

Figure 3:
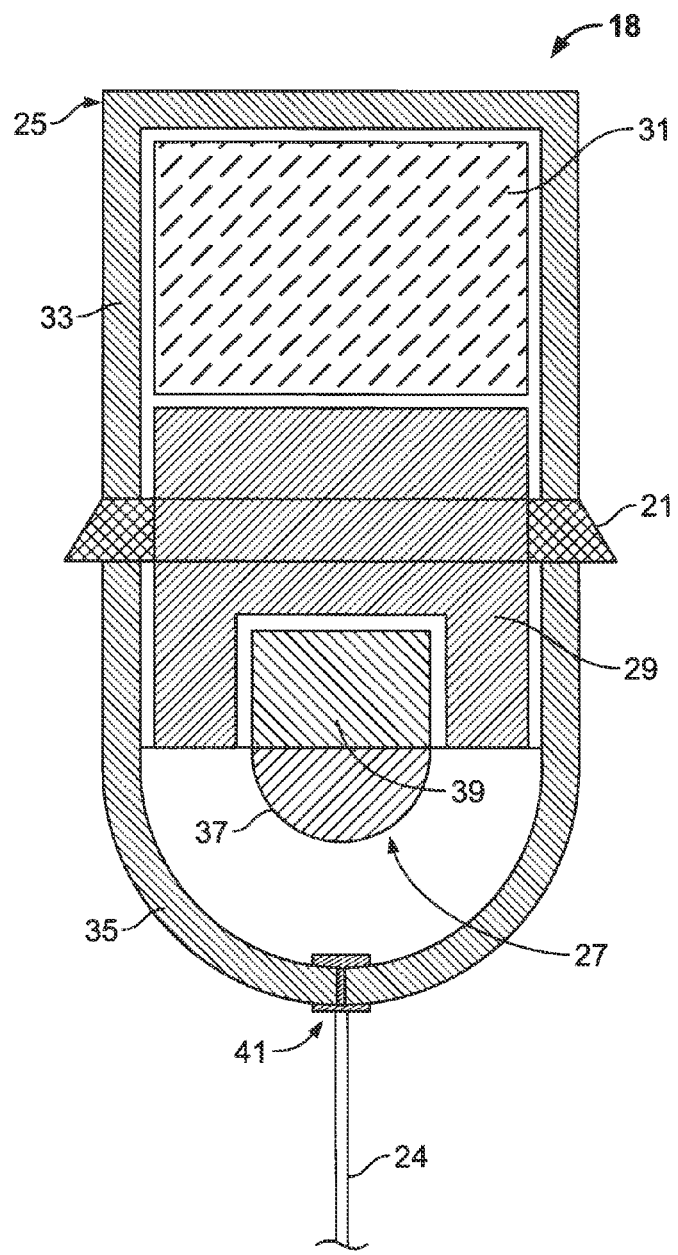
FIG. 3 is a cross-sectional view of a floating video camera system of the type shown in FIGS. 1-2, illustrating various exemplary components and structures according to an aspect of the present invention.

FIG. 3 illustrates, by way of example only, the video camera system 18 constructed according to one aspect of the invention. The video camera system 18 may include a housing 25 which contains a video camera 27, a power supply 29, a floating element 31, and the light source 21. The shape of the housing 25 may take any number of different forms, including but not limited to generally cylindrical (as shown in FIG. 1), conical, spherical, rectangular and/or any combination thereof, depending upon a variety of factors (e.g. aquadynamics, the manner and extent of the electronics and/or mechanical components forming part of the video camera system 18, etc. . . . ). In this example, the housing 25 includes an upper canister 33 and a lower bulb 35, which may be screwed together or otherwise coupled in any suitably water-tight manner. The canister 33 and bulb 35 may be constructed from any suitable material, including but not limited to plastic for corrosion-resistance, with bulb 35 being translucent or clear to allow the video camera 27 to obtain clear video images according to the present invention. The bulb 35 may also include a water-proof grommet 41 for coupling the tether 24 to the video camera system 18, although it will be appreciated that the tether 24 may be coupled to the housing 25 in any number of suitable manners without departing from the scope of the invention. Though not shown, it is contemplated that the housing 25 may include a spooling mechanism (automated or manual) to selectively retract the tether 24 into the housing 25 to shorten the tether 24 and thereby lower the video camera system 18 towards the anchor 12, as well as selectively pay out the tether 24 from the housing 25 to lengthen the tether 24 and thereby raise the video camera system 18 relative to the anchor 12.

The video camera 27 may include a lens element 37 and a video capture element 37 which cooperate to obtain and transmit video images according to the present invention. The lens element 37 may be non-adjustable and thus provide a predetermined field of view 20 or adjustable (manually and/or automatically) to optimize the field of view 20 and/or change the type of view (e.g. focused, panoramic, etc. . . . ), as described above. The power supply 29 is electrically coupled to the video camera 27 and light source 21 to drive the operation of the associated electronics. The power supply 29 may be any number of suitable power supplies, including but not limited to off-the-shelf batteries and/or a custom, rechargeable battery pack. Although shown by way of example, it will be appreciated that the video camera system 18 may include more or less components than shown in FIG. 3 without departing from the scope of the invention. For example, the power supply 29 may be omitted if the video camera system 18 is hard-wired to the vessel 10, such as will be described below with reference to FIG. 4.

The floating element 31 may be any suitable device or structure which causes the video camera system 18 to be positioned generally above the anchor 12, including but not limited to cork, Styrofoam, a structure having one or more enclosed pocket(s) of air or other gas. Although not shown, as will be described in greater detail below, the video camera system 18 may also be equipped with a water source capable of directing water towards the anchor 12 for the purpose of clearing away debris to improve the ability to capture meaningful video images. In this instance, the water source itself may augment the ability of the video camera system 18 to be maintained generally vertically above the anchor 12, due to the upward forces exerted upon the video camera system 18 by the downward flowing water.

The light source 21 may comprise any type of light source capable of sufficiently illuminating the anchor 12 to obtain meaningful video images according to the present invention, including but not limited to light emitting diode (LED) lights, plasma lights, halogen lights, and HID lights. With reference to FIGS. 2-3, the light source 21 is shown, by way of example only, extending along the perimeter of the housing 25 in a generally circular or "band-like" fashion. This configuration is intended to cause the field of illumination 23 to take a generally conical shape to encompass not only the anchor 12 but also the surrounding region. It will be appreciated, however, that the light source 21 may be provided as a number of individual lights, and that the field of illumination 21 may take any number of additional shapes without departing from the scope of the present invention.

Figure 4:
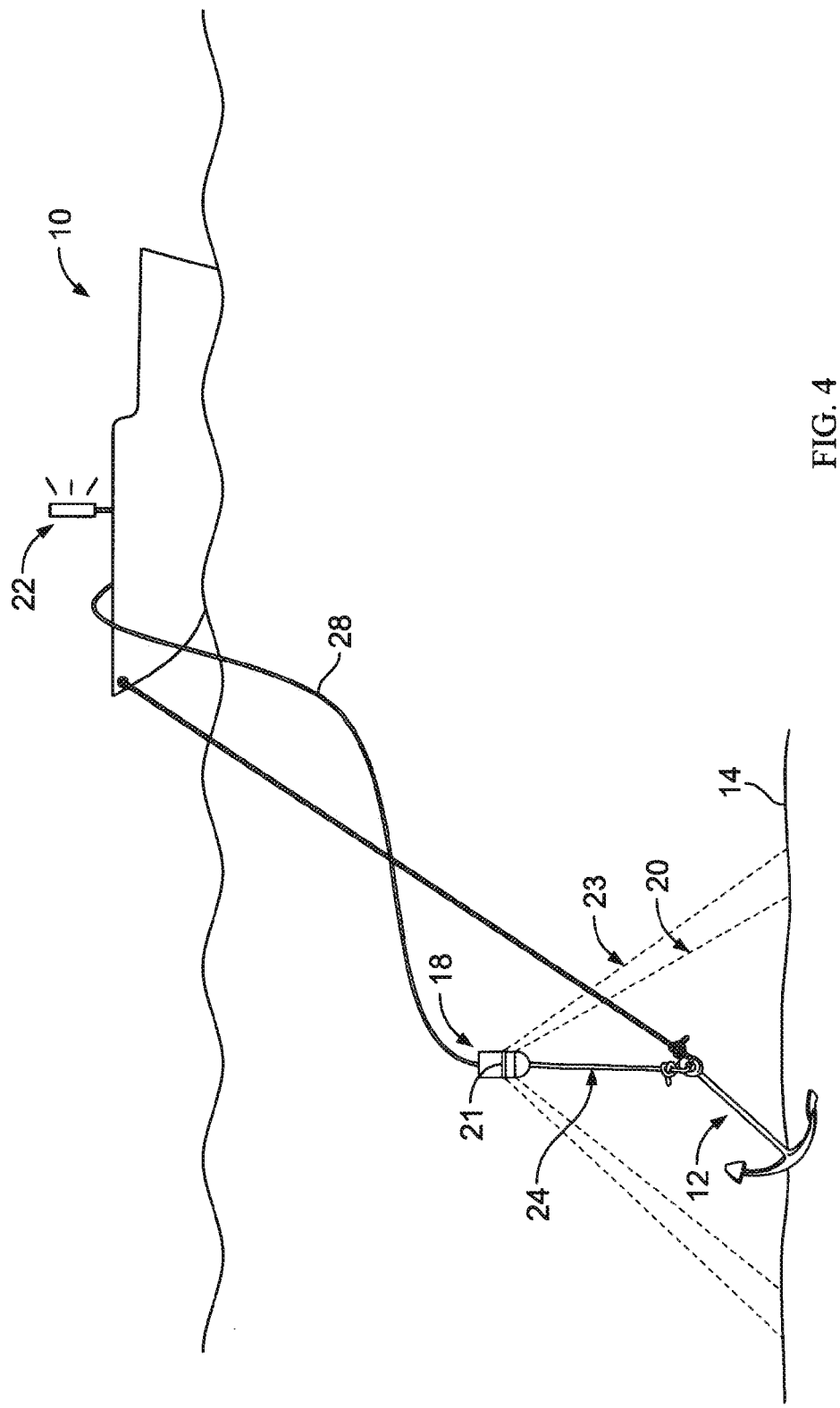
FIG. 4 is a partial side view of a maritime vessel at anchor with anchor surveillance of the type shown in FIGS. 1-3, with a tether extending from the floating video camera system to the maritime vessel according to an aspect of the present invention.

FIG. 4 illustrates another aspect of the present invention, wherein the video camera system 18 is of the type shown and described above with reference to FIGS. 1-3, but communicatively coupled to the vessel 10 via a cable 28. The cable 28 may include the necessary electrical wiring and/or fiber optics to transmit the video images from the floating video camera system 18 to the remote video display 22. The cable 28 may be directly coupled to the remote video display 22 and/or wirelessly linked to the remote video display 22 (e.g. via a wireless router located on the vessel 10 and coupled to the cable 28). The cable 28 may also include the necessary electrical wiring and/or fiber optics to communicate control instructions from the vessel 10 (e.g. adjusting the field of view 20, turning the light source 21 off and on, etc. . . . ), as well as to supply power to the floating video camera system 18 for the purpose of running the on-board electronics (e.g. video camera 27, light source 21, etc. . . . ). As noted above, providing power to the video camera system 18 in this manner may obviate the need for the on-board power supply 29 shown by way of example in FIG. 3.

Figure 5:
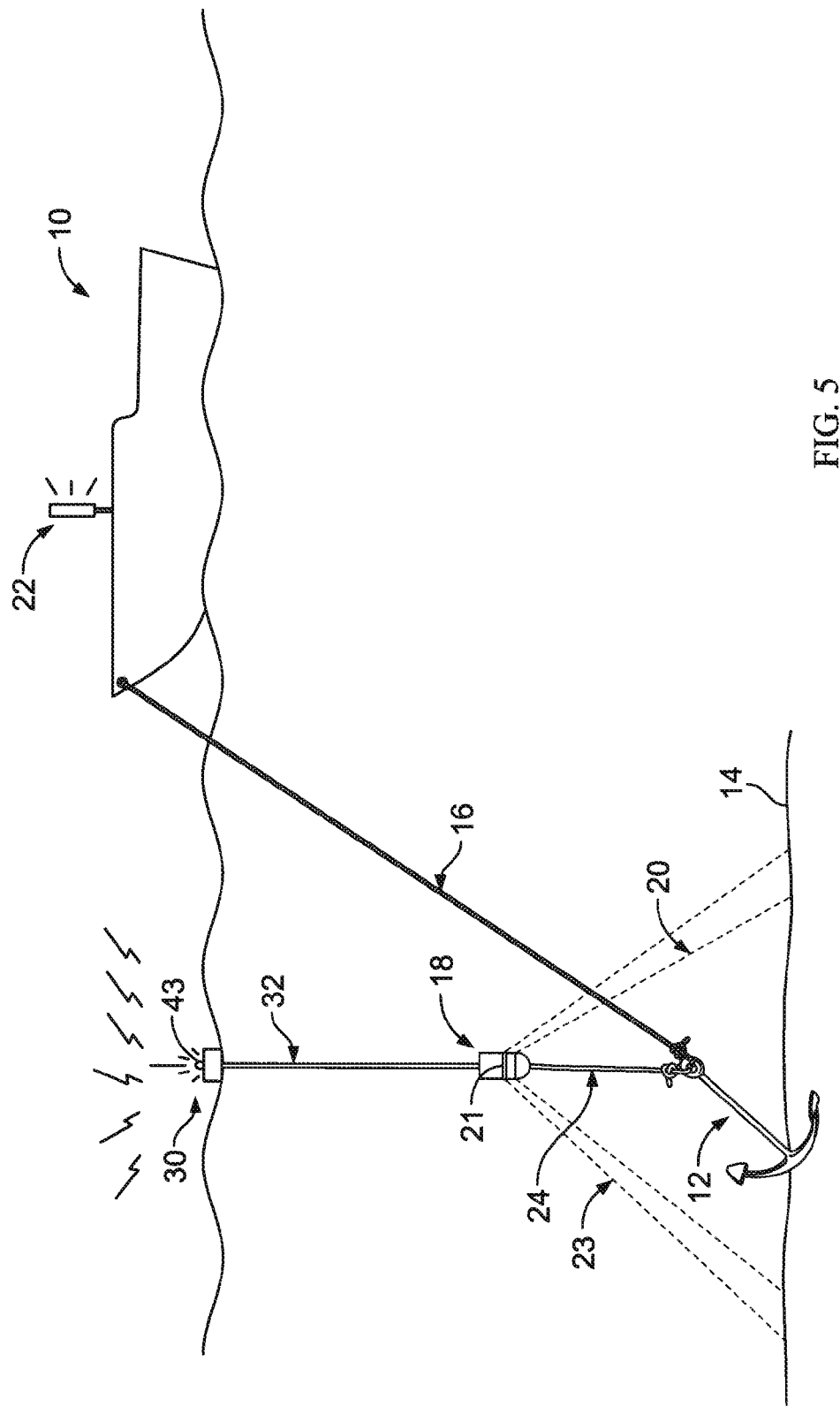
FIG. 5 is a partial side view of a maritime vessel at anchor with an anchor surveillance system of the type shown in FIGS. 1-3, with a communications float coupled to the video camera system according to an aspect of the present invention.

FIG. 5 illustrates a further aspect of the present invention, wherein a floating communications module 30 may be coupled to the video camera system 18 via a tether 32. The communications module 30 may be communicatively coupled to the video camera system 18 and contain the necessary electronics in order to wirelessly transmit video images to the remote video display 22. The communications module 30 may also include a light 43 in order to alert neighboring vessels as to the location of the anchor 12, which may be particularly advantageous at night so newly arriving vessels avoid anchoring too close to the anchor 12 of the vessel 10. Communications module 30 may optionally include at least one solar cell (not shown) and at least one battery (not shown) configured to at least partially power the light 43 and the on-board electronics. The communications device 30 may be equipped with any suitable device or structure which causes it to float at or near the surface of the water, including but not limited to cork, Styrofoam, a structure having one or more enclosed pocket(s) of air or other gas. The tether 32 may be fixed or retractable without departing from the scope of the invention. If retractable, the tether 32 may automatically adjust to the appropriate length with sufficient tension to keep the video camera system 18 generally above the anchor 12. This may eliminate or minimize the need to have a separate floating element 31 as part of the video camera system 18, shown by way of example only in FIG. 3.

Figure 6:
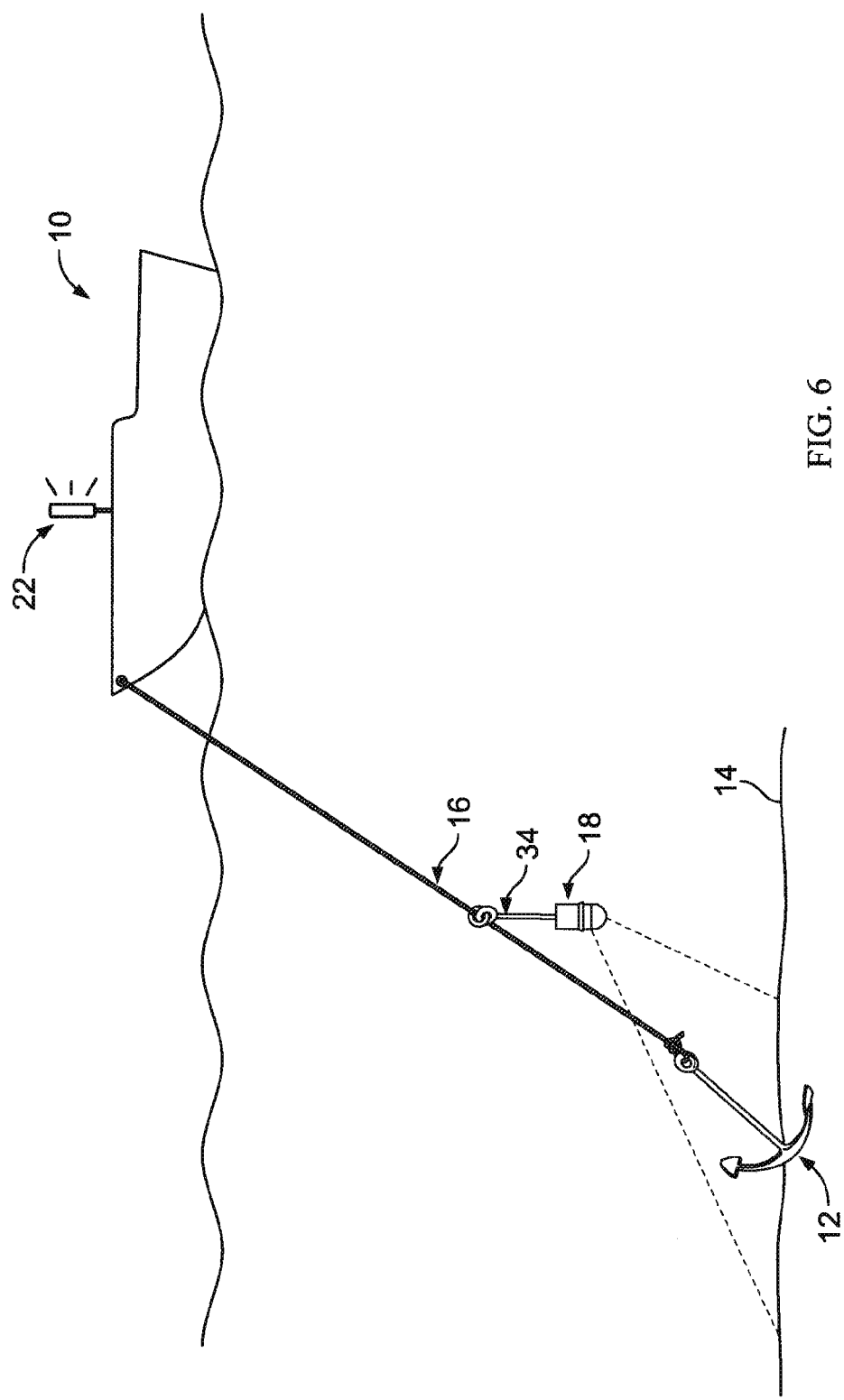
FIG. 6 is a partial side view of a maritime vessel at anchor with anchor surveillance according to an aspect of the present invention, with a video camera system coupled indirectly to an anchor rode.

FIG. 6 illustrates a further aspect of the present invention, wherein the video camera system 18 may be indirectly coupled to the anchor rode 16 via a tether 34 to maintain the video camera system 18 generally vertically beneath the coupling point. To facilitate this, the video camera system 18 may include a weight or other ballast to cause it hang generally vertically as shown in FIG. 6. The tether 34 may be coupled directly to the anchor rode 16 at a predetermined location along its length using any number of suitable coupling features, including but limited to snap hooks, shackles, chain links, etc. . . . The video camera system 18 may be positioned along the anchor rode 16 to optimize the field of view 20 to capture and provide the most accurate and meaningful video images of the anchor 12, particularly if the field of view 20 isn't remotely adjustable after the anchor 12 has been deployed and/or set. Of course, the field of view 20 of the video camera system 18 (and field of illumination, as well, although not shown) may be adjustable to be directional, as shown, in order to obtain video images of the anchor 12 which is offset horizontally relative to the video camera system 18.

Figure 7:
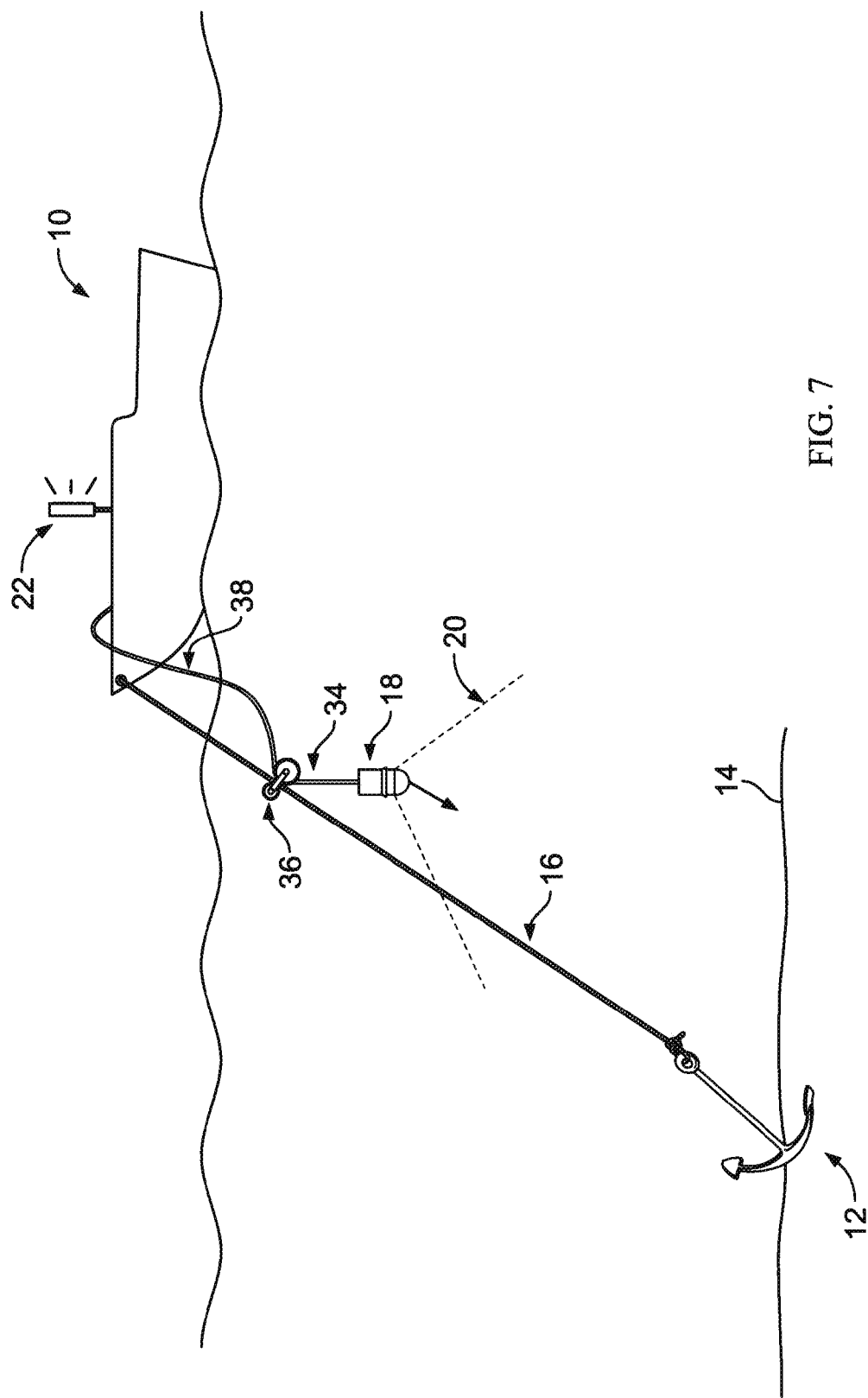
FIG. 7 is a partial side view of a maritime vessel at anchor with anchor surveillance according to an aspect of the present invention, with a video camera coupled indirectly to an anchor rode via a traveler system.

FIG. 7 illustrates a further aspect of the present invention, wherein the video camera system 18 may be indirectly coupled to the anchor rod 16 via a traveler system 36 to maintain the video camera system 18 generally vertically beneath the coupling point. In this aspect of the present invention, the tether 34 of FIG. 6 is coupled to the traveler system 36 (versus the anchor rod 16 itself). The traveler system 36 is capable of traversing along the anchor rod 16 to selectively position the video camera system 18 at a desired location along the length of the anchor rod 16. The traveler system 36 may be motorized and/or manually movable without departing from the scope of the present invention. If motorized, the traveler system 36 may be powered in any number of suitable manners (e.g. electrical, pneumatic, hydraulic, etc. . . . ) and include any number of suitable purchase features for providing adequate purchase between the traveler system 36 and the anchor rod 16 such that the traveler system 36 can be moved along the anchor rod 16 (e.g. chain rollers, opposed rubber rollers, etc. . . . ). If manually movable, the traveler system 36 may simply include a weighted roller such that the video camera system 18 may descend along the anchor rod 16 under the force of gravity (with or without a weight in the video camera system 18). The traveler system 36 may include a tether 38, which may be multi-purpose in function. In one aspect, the tether 38 may be used to established electrical communications for control if the traveler system 36 is motorized. In another, more basic aspect, the tether 38 may be used to manually control the ascent and descent of the traveler system 36 if it is either not motorized or the motor is malfunctioning.

Figure 8C:
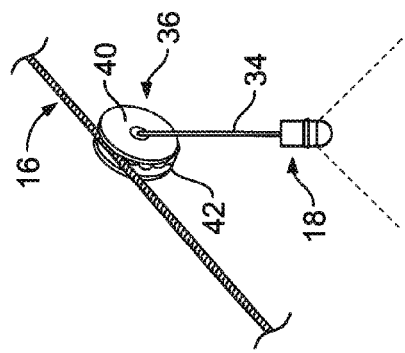
FIGS. 8A-8C are side, top and perspective views, respectively, of a traveler system of the type shown in FIG. 7 according to an aspect of the present invention.
Figure 9C:
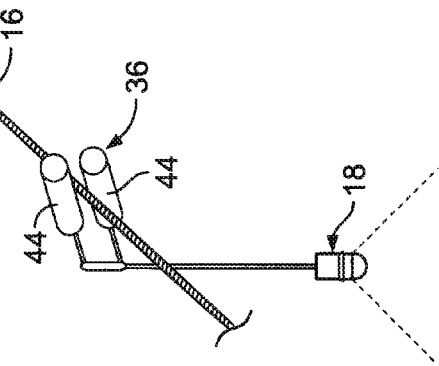
FIGS. 9A-9C are side, top and perspective views, respectively, of a traveler system according to another aspect of the present invention.
Figure 8B:
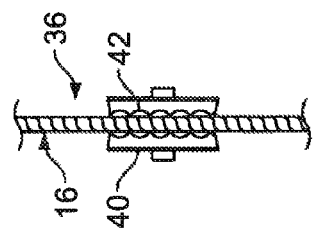
Figure 9B:
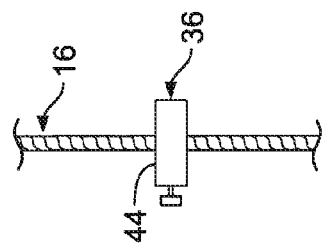
Figure 8A:
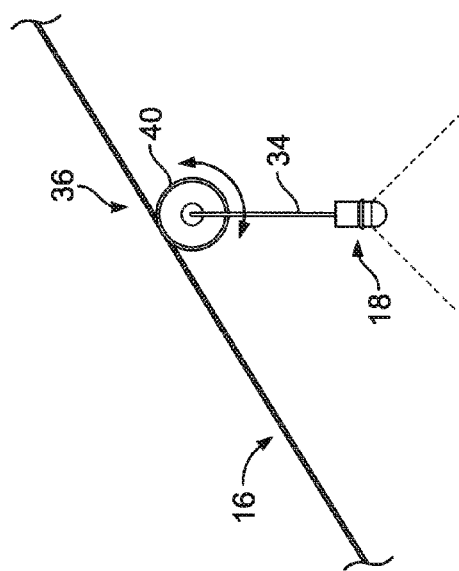
Figure 9A:
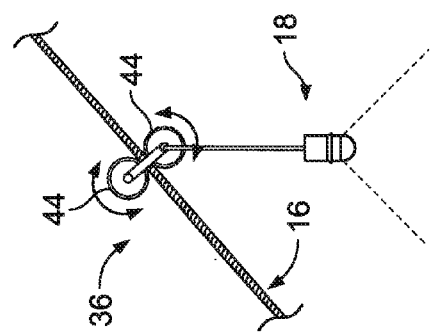

The traveler system 26 may be provided in any number of suitable fashions without departing from the scope of the present invention. FIGS. 8A-8C illustrate, by way of example only, the traveler system 36 according to one aspect of the present invention. The traveler system 36 includes a roller 40 having a generally circular shape about its periphery and a series of engagement features 42 for engaging with the anchor rod 16. In this example, the anchor rod 16 is a length of chain, such that the engagement features 42 are shaped to receive and engage the links forming the chain (much like a Windlass) and thereby establish sufficient purchase for the traveler 36 to traverse up or down the anchor rode 16. FIGS. 9A-9C illustrate, by way of example only, the traveler system 36 according to another aspect of the present invention. The traveler system 36 includes a pair of opposed rollers 44 disposed on either side of the anchor rod 16. The rollers 44 are preferably biased towards one another in order to provide sufficient purchase between the traveler system 36 and the anchor rod 16. The rollers 44 may traverse up and/or down the anchor rod 16 manually under the weight of the video camera system 18 and/or the traveler system 36 by manually tending the tether 38. The rollers 44 may also be powered to drive the traveler 36 up or down the anchor rod 16, such as if the tether 38 is equipped to deliver electrical, pneumatic, hydraulic or other means of powering the traveler system 36 along the anchor rod 16 according to the present invention.

The anchor surveillance systems of FIGS. 1-9 are all indirectly coupled to the anchor 12 (FIGS. 1-6) or the anchor rode 16 (FIGS. 7-9). It will be appreciated, however, that the video camera system 18 may also be directly coupled to the anchor 12 and/or anchor rod 16 without departing from the scope of the present invention.

Figure 10:
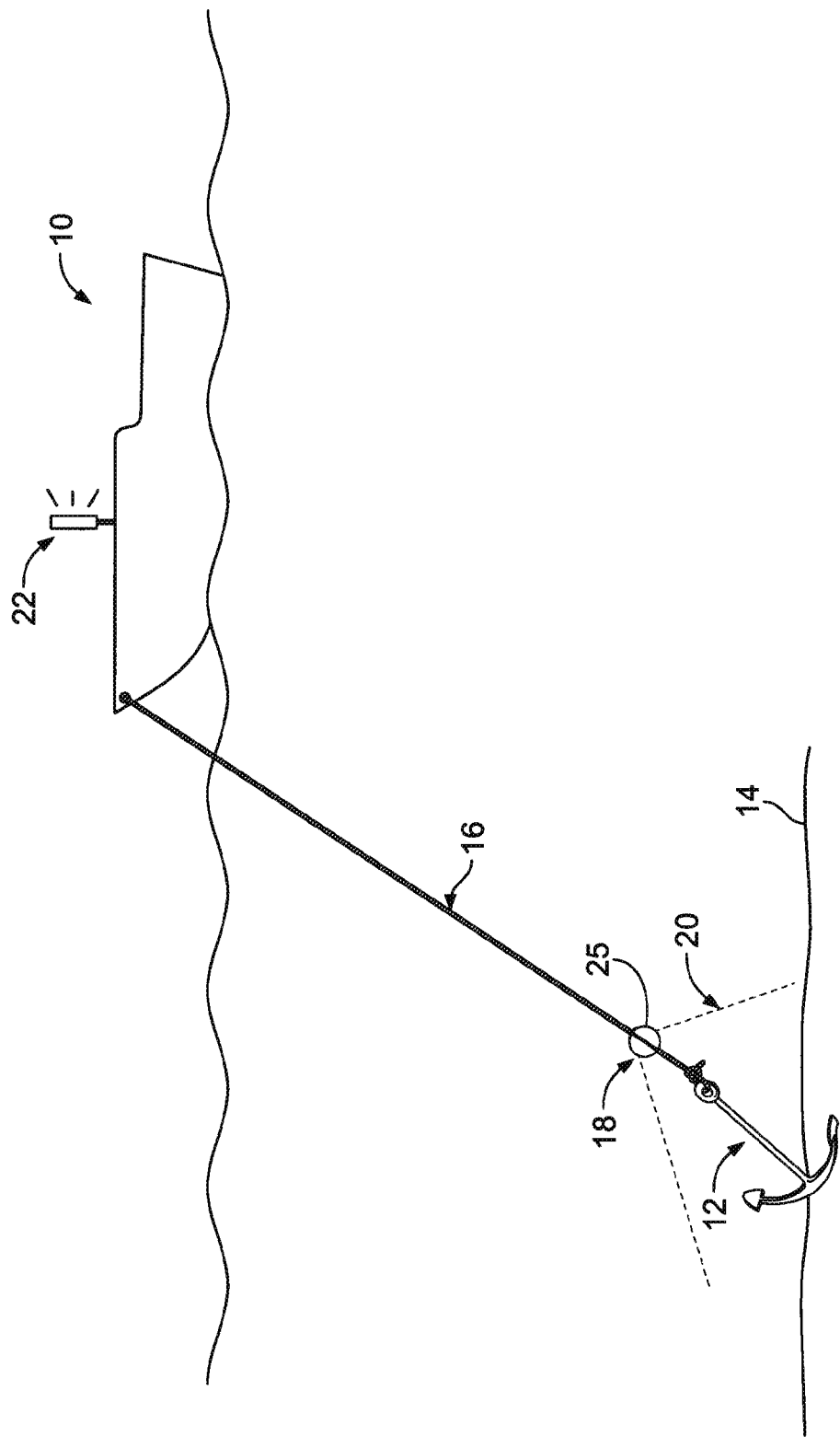
FIG. 10 is a partial side view of a maritime vessel at anchor with anchor surveillance according to an aspect of the present invention, with a video camera having a split-shell housing directly coupled to the anchor rode.
Figure 11:
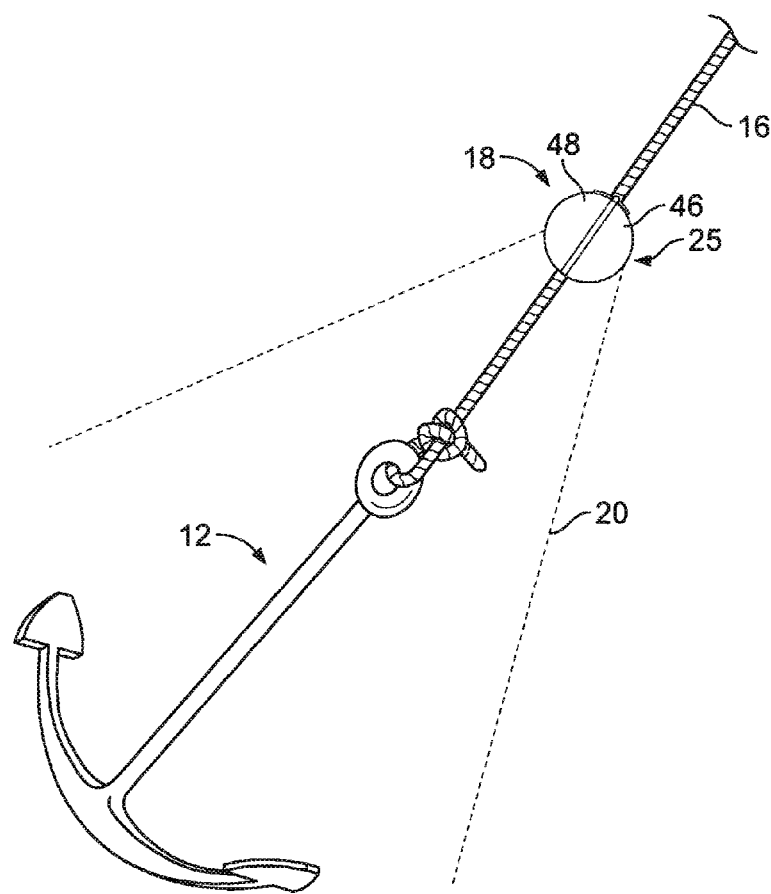
FIG. 11 is an enlarged view of a video camera system having a split-shell housing directly coupled to the anchor rode according to an aspect of the present invention.

FIGS. 10-11 illustrate the feature of directly coupling the video camera system 18 to the anchor rod 16 according to one aspect of the present invention. In this instance, this is accomplished by providing the video camera system 18 with a housing 35 of split-shell construction. As best shown in FIG. 11 (side view) and FIG. 12 (partial cross-section), the housing 25 includes a first half 46 and a second half 48 coupled together via a hinge 50. Due to the hinged relation, the first half 46 and second half 48 may be selectively moved away from one another about the axis of the hinge 50 to "open" the housing 25. With the housing 25 in the open position, it may be positioned at any desired location along the anchor rode 16. The first half 46 and second half 48 may then be moved towards one another about the axis of the hinge 50 in order to "close" the housing 25 about the anchor rod 16.

Figure 12:
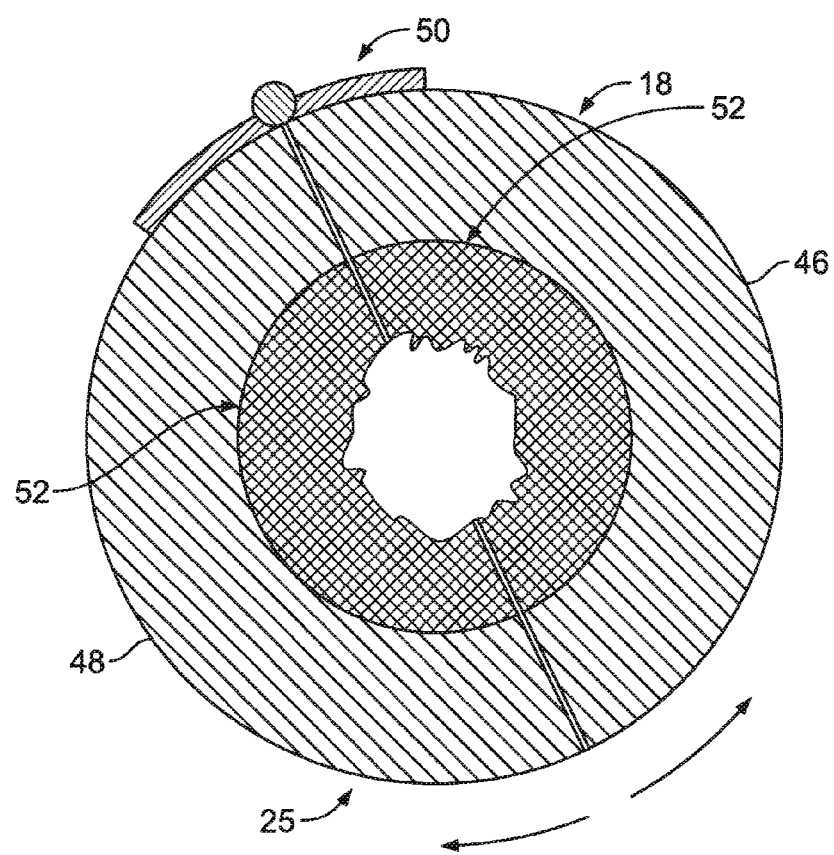
FIG. 12 is a cross-sectional view of the split-shell housing of the video camera system of the type shown in FIGS. 10-11 according to an aspect of the present invention.

As best viewed in FIG. 12, to facilitate this direct coupling, the interior of the first half 46 and/or second half 48 may be equipped with a deformable section 52. The deformable section 52 is designed to accommodate anchor rodes of various diameters and/or cross-sectional shapes while still providing a snug fit between the housing 25 and the anchor rode 16. The deformable section 52 may be constructed in any number of suitable manners with any number of suitable materials, including but not limited to a rubber membrane (inflatable or non-inflatable), foam (shape memory or otherwise), etc. . . . If inflatable, the deformable membrane 52 may be selectively deflated in order to move the housing 25 up or down the anchor rod 16 (before or after the anchoring process) and thereafter re-inflated to fix the video camera system 18 in the new position. This may be particularly advantageous if the view from the original location is sub-optimal, as a way to refine and optimize the video images captured by the video camera system 18 according to an aspect of the present invention.

Figure 13:
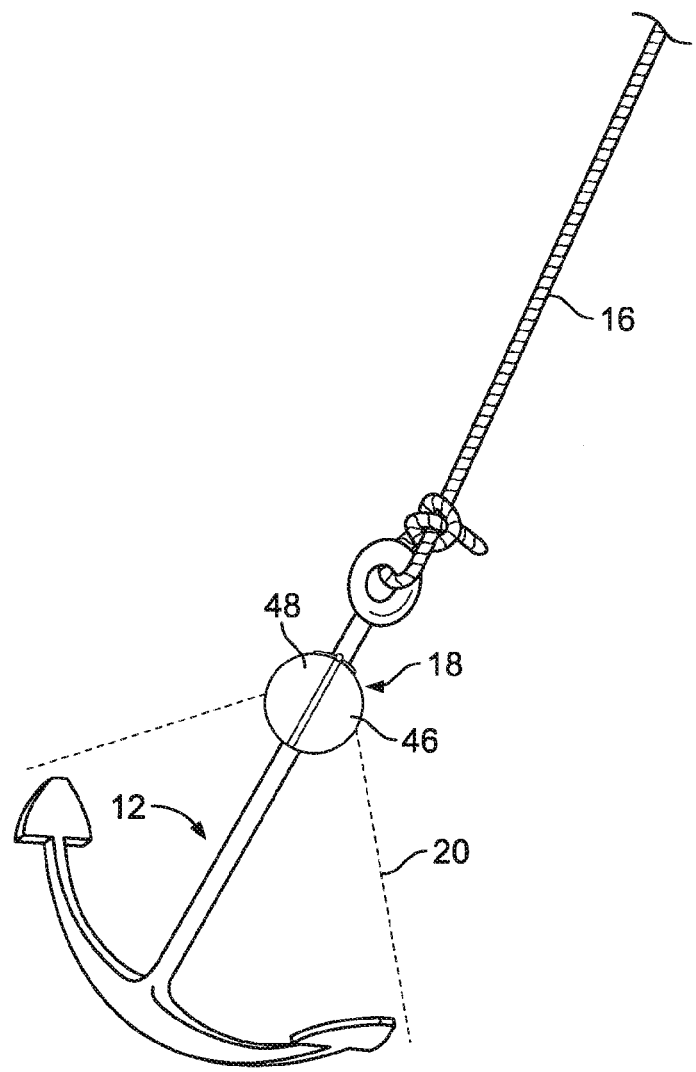
FIG. 13 is an enlarged view of a video camera system of the type shown in FIGS. 10-11 having a split-shell housing directly coupled to the shaft of an anchor according to an aspect of the present invention.

Although not shown, the first half 46 and/or second half 48 may contain any number of electronic and/or mechanical components to perform the underwater video surveillance according to the present invention, including but not limited to video camera equipment, one or more light sources, water sources, power sources, etc. . . . Although shown and described above with respect to the anchor rod 16, it will be appreciated that the video camera system 18 of split-shell construction may also be directly coupled to the anchor 12, as shown by way of example in FIG. 13.

Figure 14:
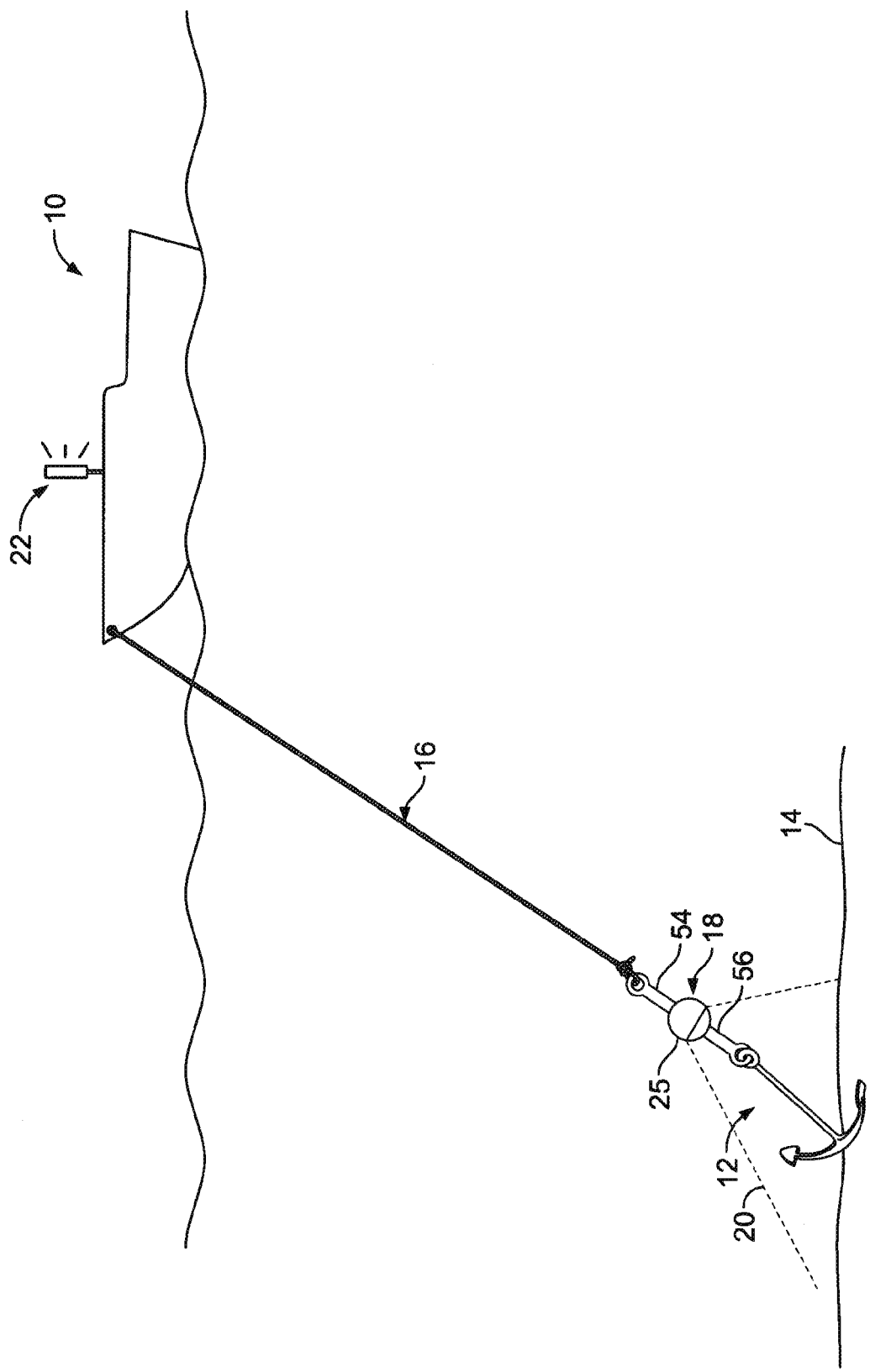
FIG. 14 is a partial side view of a maritime vessel at anchor with anchor surveillance according to an aspect of the present invention, with a video camera system having tethers for directly coupling to both the anchor and the anchor rode.
Figure 15:
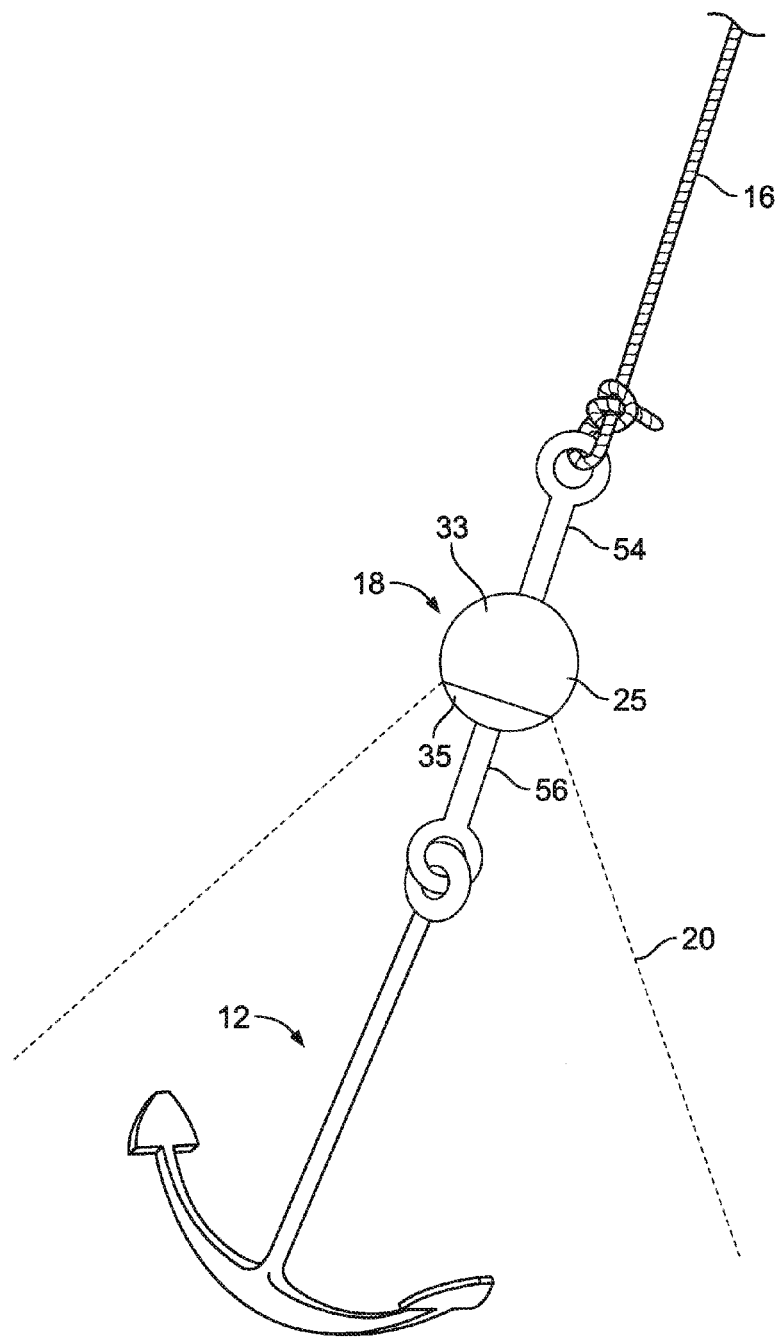
FIG. 15 is an enlarged view of a video camera system of the type shown in FIG. 14 having tethers for directly coupling to an anchor rode according to an aspect of the present invention.
Figure 16:
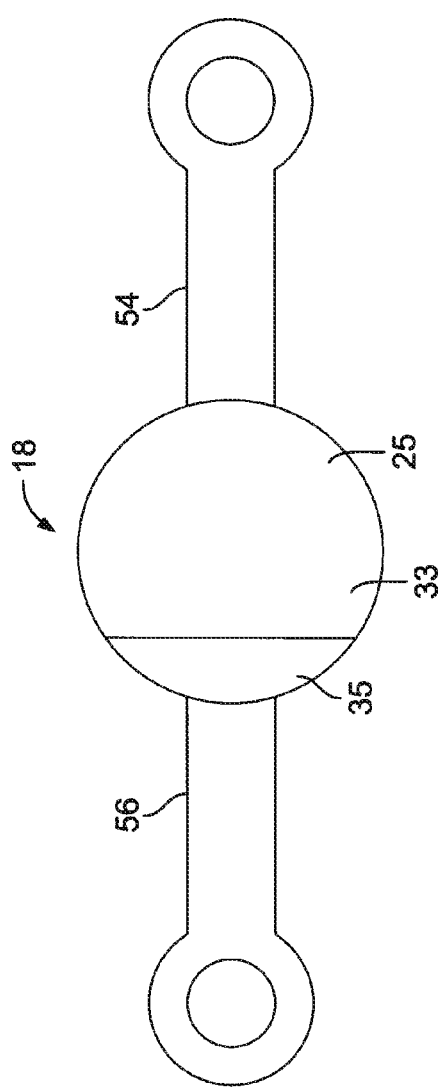
FIG. 16 is a top view of the video camera system shown in FIGS. 15-16.

FIGS. 14-16 illustrate yet another manner of directly coupling the video camera system 18 to the anchor 12 and/or anchor rod 16 according to a still further aspect of the present invention. In this instance, this is facilitated by providing the video camera system 18 with a proximal tether 54 and a distal tether 56 coupled to and/or forming part of the housing 25. The tethers 54, 56 may be constructed from any number of suitable materials, including but not limited to chain link, rope, cable, etc. . . . The end of each tether 54, 56 is capable of being coupled directly to the eye of the anchor 12 and/or the anchor rod 16. For example, as shown in FIG. 15, the end of the distal tether 56 may be directly coupled to the eye of the anchor 12, while the proximal tether 54 may be directly coupled to the anchor rod 16. The housing 25 may be of two-part construction of the type described above with reference to FIG. 3 (though with different shapes for the canister 33 and bulb 35, being more spherical as shown in FIGS. 15-16).

Although not shown, the video camera system 18 of FIGS. 14-16 may also be disposed solely along the anchor rod 16, with the distal tether 56 coupled to a distal length of anchor rod 16 (e.g. chain coupled to the anchor 12) with the proximal tether 54 coupled to a proximal length of anchor rod 16 (e.g. rope extending to the vessel 12, not shown).

Figure 17:
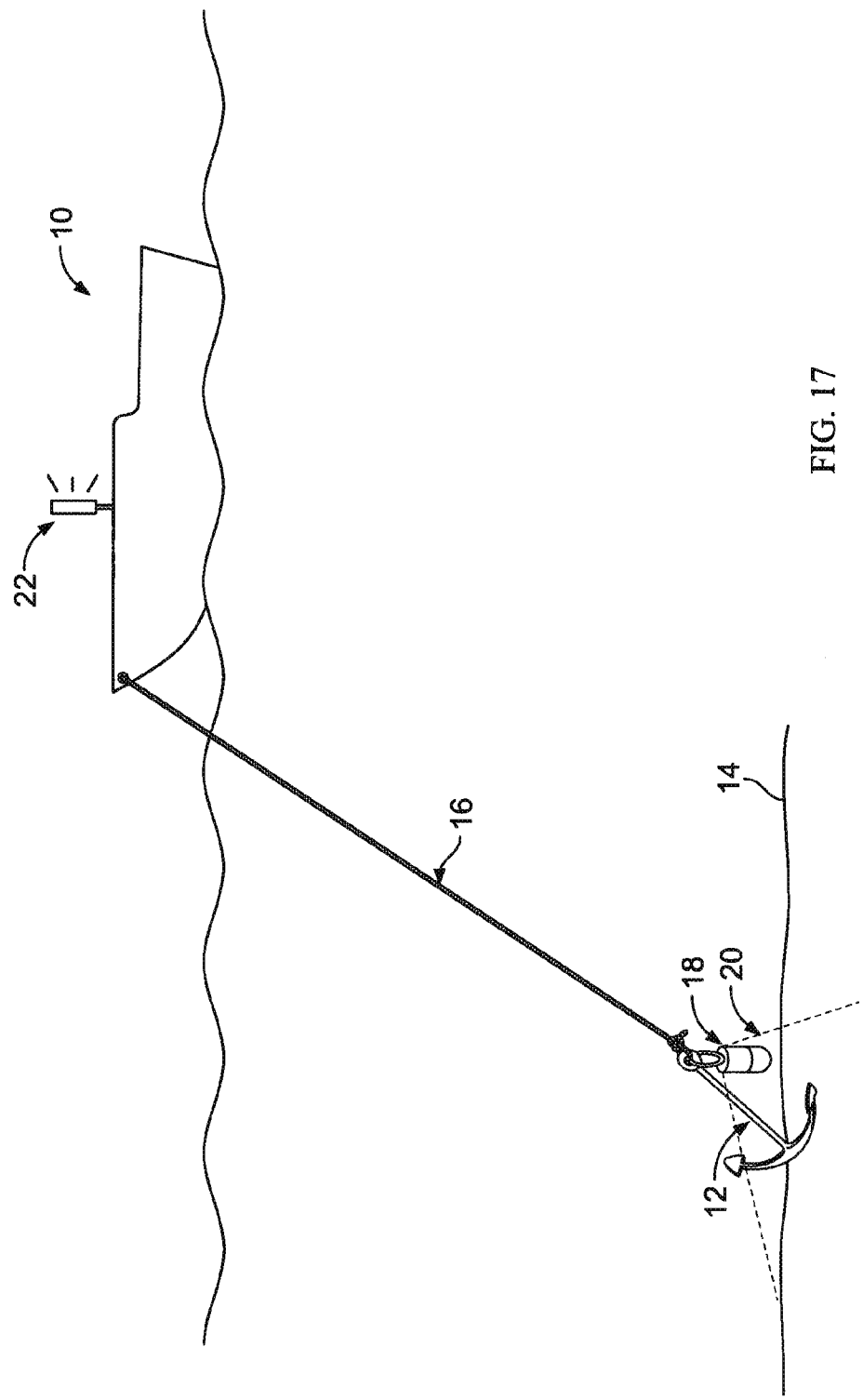
FIG. 17 is a partial side view of a maritime vessel at anchor with anchor surveillance according to an aspect of the present invention, with a video camera system directly coupled to the anchor.
Figure 18:
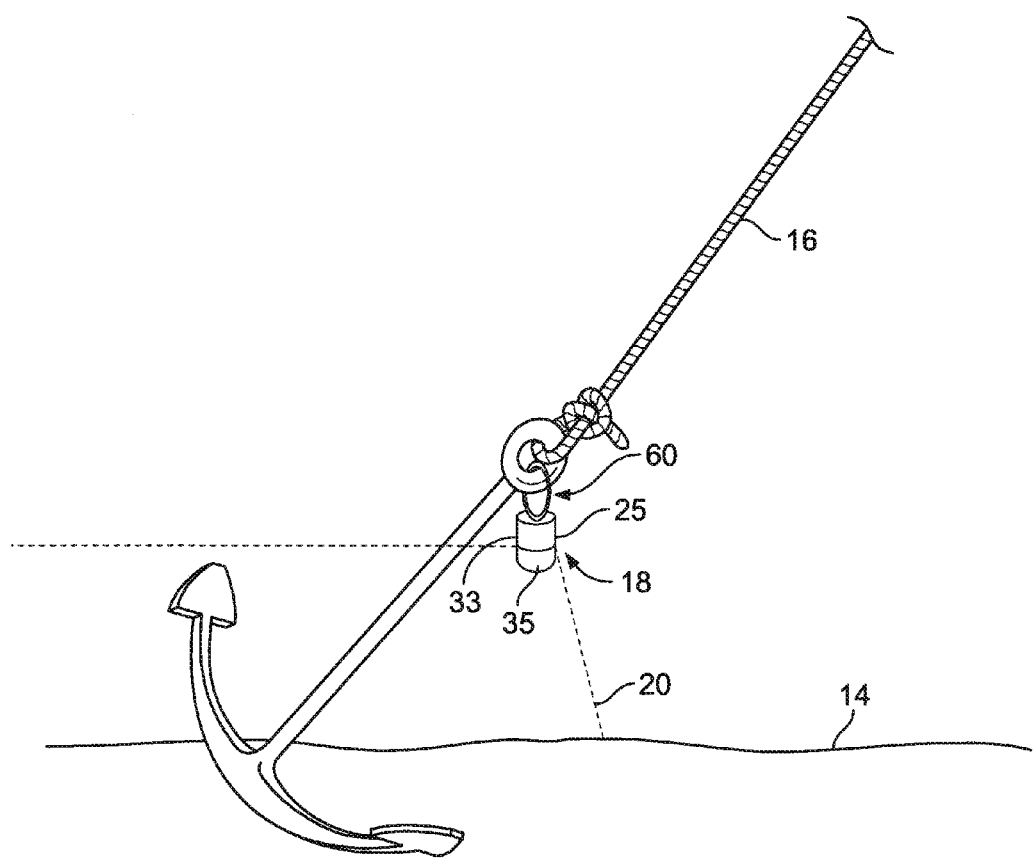
FIG. 18 is an enlarged view of a video camera system of the type shown in FIG. 17 directly coupled to the eye of an anchor according to an aspect of the present invention.

FIGS. 17-18 illustrate another manner of directly coupling the video camera system 18 to the anchor 12 and/or anchor rode 16 according to a still further aspect of the present invention. In this example, the video camera system 18 may have a generally cylindrical housing 25 coupled to an eye of the anchor 12 via a snap-hook 60. It will be appreciated that the housing 25 may be coupled to the eye of the anchor 12 with any number of suitable coupling mechanisms beyond the snap-hook 60, including but not limited to shackles, chain links, etc. . . . Although not shown, it will also be appreciated that the video camera system 18 may be directly coupled to a chain section forming part of the anchor rode 16 in a similar manner, with snap-hooks, shackles, chain links, etc. . . . The video camera system 18 shown in FIGS. 17-18 may be configured in any manner described above, such that the foregoing description of variations, features, options, etc. . . . need not be repeated here.

Figure 19:
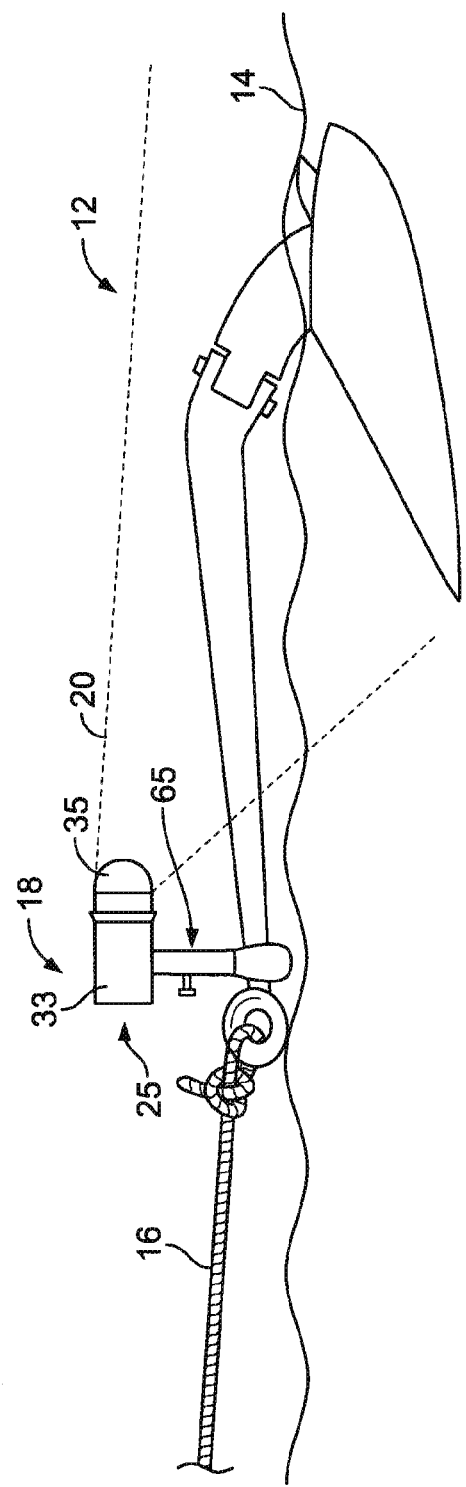
FIG. 19 is an enlarged view of a video camera system directly coupled to an anchor using a brace system according to another aspect of the present invention.
Figure 20:
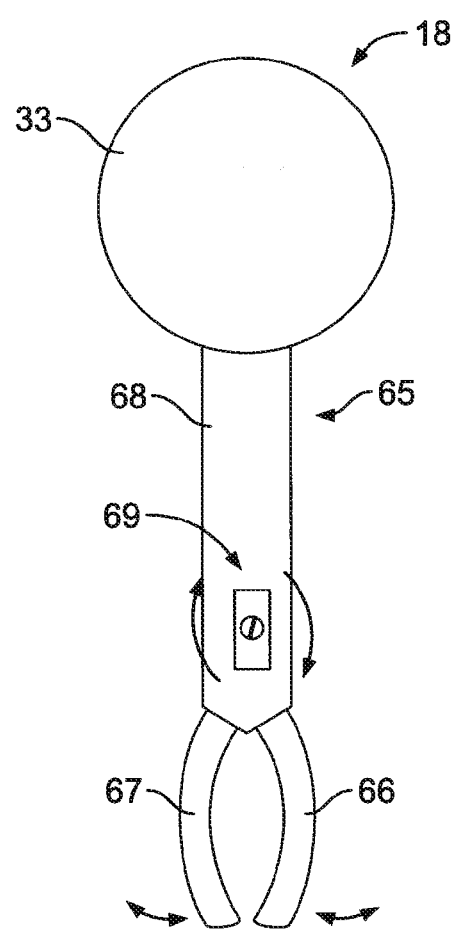
FIG. 20 is an end view of the video camera system and brace system shown in FIG. 19, illustrating the construction of the brace system according to an aspect of the present invention.

FIG. 19 illustrates a still further manner of coupling the video camera system 18 to the anchor 12 via a brace system 65 according to an aspect of the present invention. With combined reference to FIGS. 19-20, the brace system 65 includes a pair of opposed engagement arms 66, 67 extending hingedly from the end of a strut member 68, upon which the video camera system 18 is mounted. The engagement arms 66, 67 may be actuated towards or away from one another in any number of manners, including but not limited to a thumb wheel 69 connected to worm gear disposed with the strut member 69. By rotating the thumb wheel 69 in a counter-clockwise manner, the engagement arms 66, 67 away from one another to "open" the brace system 65 and position it at a desired location along the length of the anchor 12. The thumb wheel 69 may thereafter be rotated in a clockwise manner to move the engagement arms 66, 67 together and thus rigidly couple the video camera system 18 to the anchor 12.

As described generally above, according to an aspect of the present invention the video camera system 18 may be equipped with a water source for the purpose of clearing away debris within the field of view 20 to improve or otherwise facilitate the adequate capture of video images of the anchor 12. This may be accomplished in any number of suitable manners without departing from the scope of the invention. In any event, the water source is designed to direct water towards the anchor 12, which water is preferably clear or otherwise having with less debris than the water surrounding the anchor 12.

Figure 21:
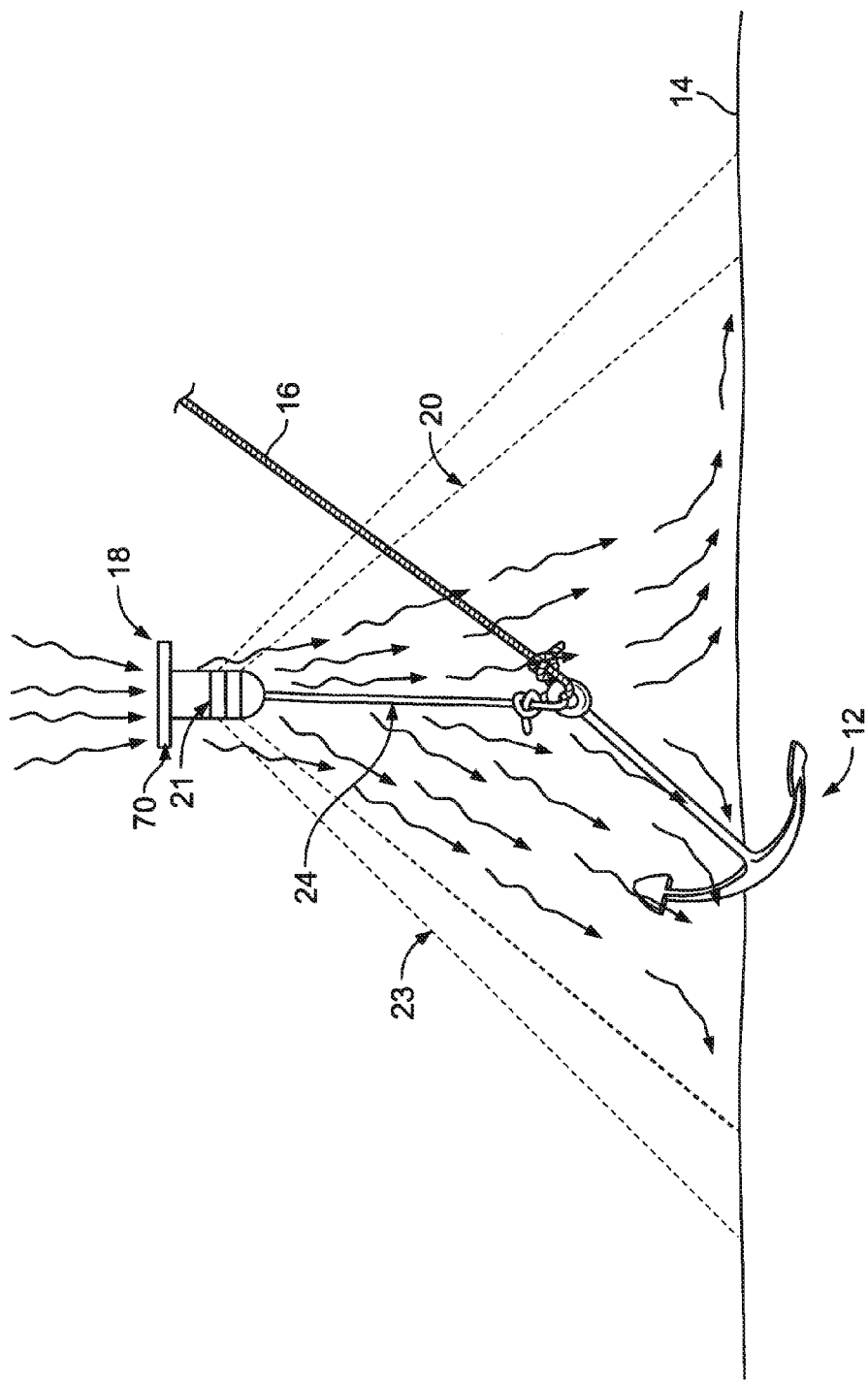
FIG. 21 is an enlarged view of a video camera system of the type shown in FIGS. 1-5 having a water source adjacent to or forming part of the video camera system according to an aspect of the present invention.

FIG. 21 illustrates one manner of providing a water source for clearing debris around the anchor 12 according to an aspect of the present invention, namely, equipping the video camera system 18 of the type shown in FIGS. 1-5 with an impeller 70 within or adjacent to the housing 25 of the video camera system 18. The impeller 70 may be operated to draw the water from the immediate vicinity of the video camera system 18 and direct this local water towards the anchor 12 (as shown with wavy arrows). Although not shown, it is also contemplated as part of the present invention to have one or more hoses extending between the video camera system 18 and at point at or near the anchor 12 (e.g. by coupling the hose(s) to the tether 24 or by having the hose form part of the tether 24) such that the water drawn by the impeller 70 may be directed in a more focused manner towards the anchor 12 than shown in FIG. 21.

Figure 22:
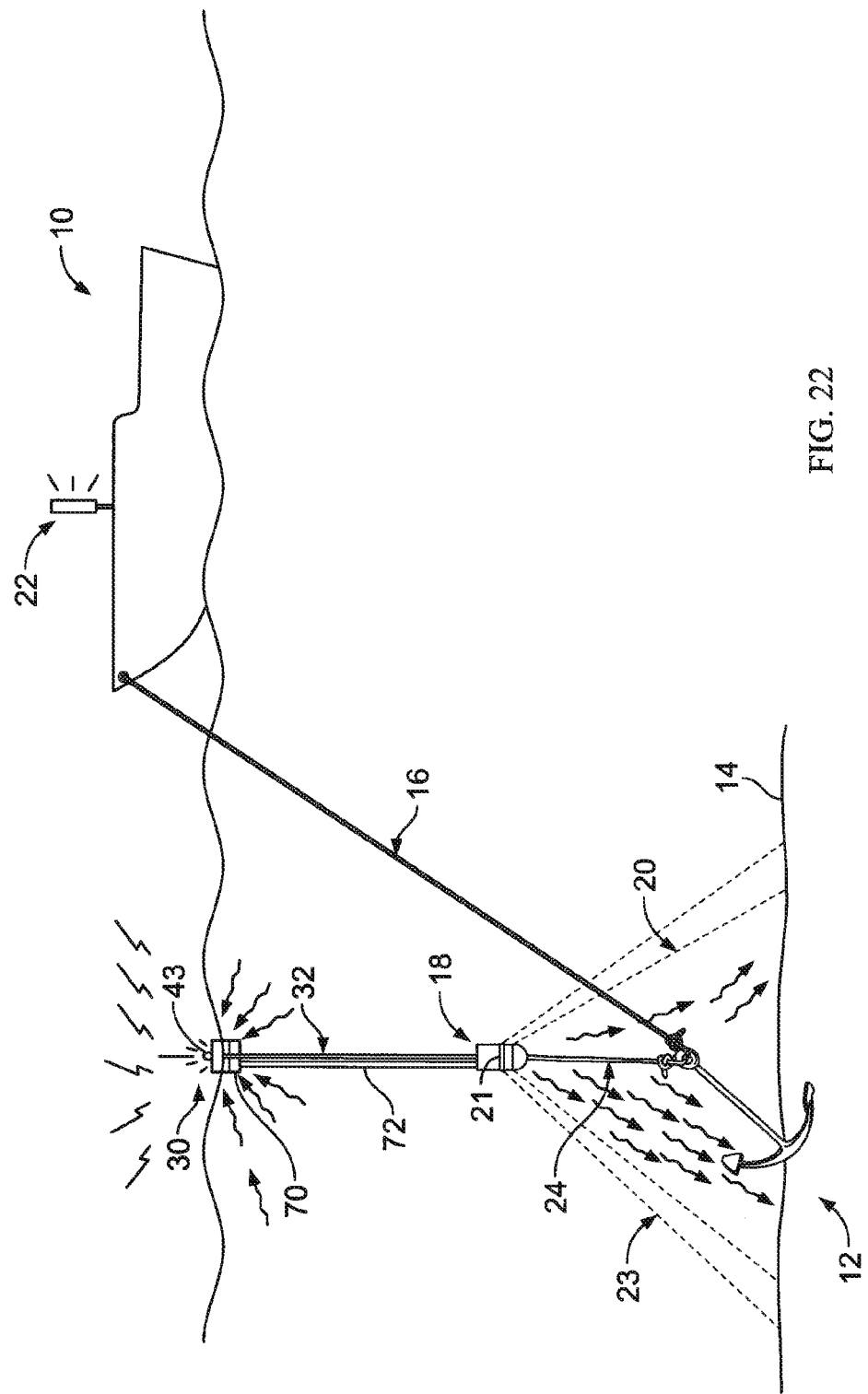
FIG. 22 is a partial side view of a maritime vessel at anchor with anchor surveillance of the type shown in FIG. 5 with a water source extending from the floating communications device to the video camera system for directing water towards the anchor.

FIG. 22 illustrates another manner of providing a water source for clearing debris around the anchor 12 according to an aspect of the present invention, namely, equipping the floating communications device 30 with an impeller 70 and transporting this remote water to the video camera system 18 via one or more hoses. The impeller 70 may be operated to draw the water from this location remote from the video camera system 18 and direct this local water towards the anchor 12 (as shown with wavy arrows). Depending upon the condition of floor 14 (e.g. sediment, mud, etc. . . . ), this remote water may be cleaner or otherwise have less debris than water local or adjacent to the video camera system 18. Although not shown, there may be one or more hoses extending between the video camera system 18 and the anchor 12 to focus this remote water as discussed above. In this instance, these hoses may be coupled to or form part of the hose 72 extending from the impeller 70 on the floating communications device 30.

Figure 23:
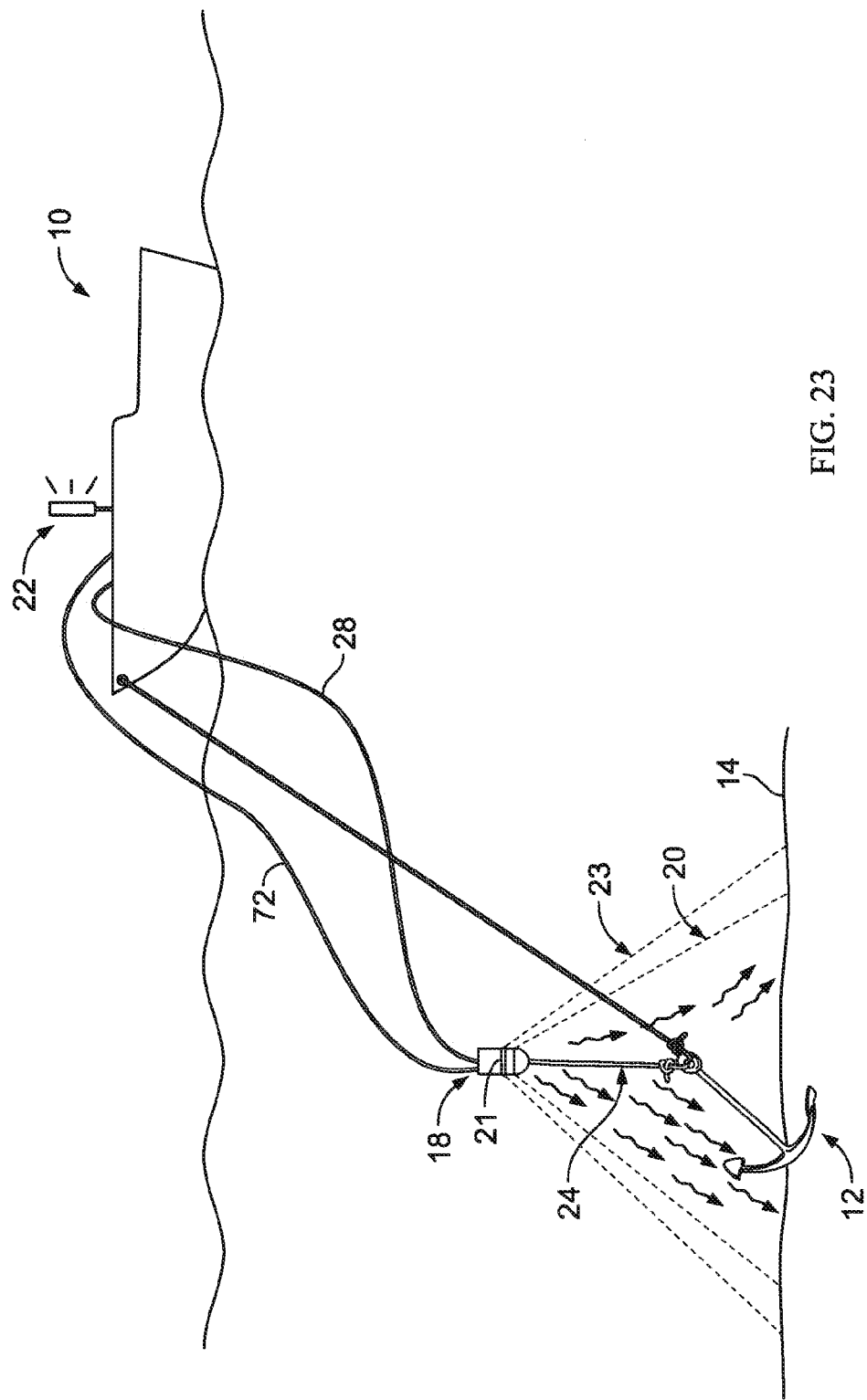
FIG. 23 is a partial side view of a maritime vessel at anchor with anchor surveillance of the type shown in FIG. 4 with a water source extending from the maritime vessel for directing water towards the anchor.

FIG. 23 illustrates a still further manner of providing a water source for clearing debris around the anchor 12 according to an aspect of the present invention, namely, equipping the video camera system 18 with a hose 72 extending from the vessel 10. The water from the vessel 10 may be drawn from the body of water or, if desired, from water contained on the vessel 10 (e.g. fresh water tanks). Depending upon the condition of floor 14 (e.g. sediment, mud, etc. . . . ), this remote water may be cleaner or otherwise have less debris than water local or adjacent to the video camera system 18. Although not shown, there may be one or more hoses extending between the video camera system 18 and the anchor 12 to focus this remote water as discussed above. In this instance, these hoses may be coupled to or form part of the hose 72 extending from the vessel 10.

Figure 24:
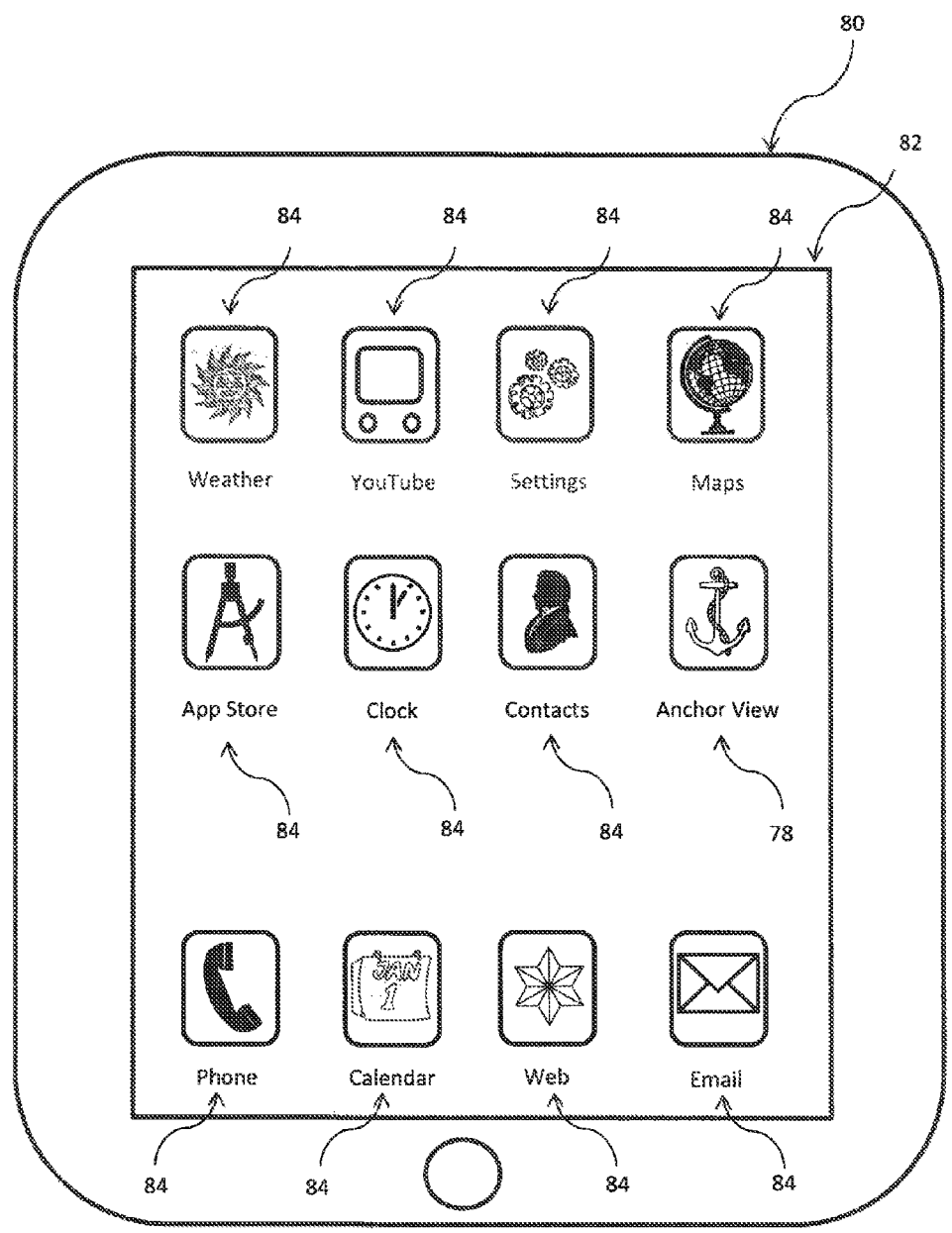
FIG. 24 is a top view of a computer tablet having a variety of standard software applications ("apps") and an Anchor View™ software application for performing anchor surveillance according to a still further aspect of the present invention.

FIGS. 24-33 illustrate an exemplary software application ("Anchor app") 78 according to another aspect of the present invention for use controlling some or all of the functionality of an anchor surveillance system with a smart-phone (not shown) and/or computer tablet 80 (shown by way of example only). As shown in FIG. 24, the tablet 80 is, by way of example only, an iPad (Apple, Inc., Cupertino, Calif.) having screen 82 with a number of exemplary software applications or "apps" 84, such as Weather, YouTube, Settings, Maps, App Store, Clock, Contacts, Phone, Calendar, Web and Email. As with the other apps 84, a user need only tap the screen 82 over the Anchor app 78 in order to initiate its functionality.

Figure 25:
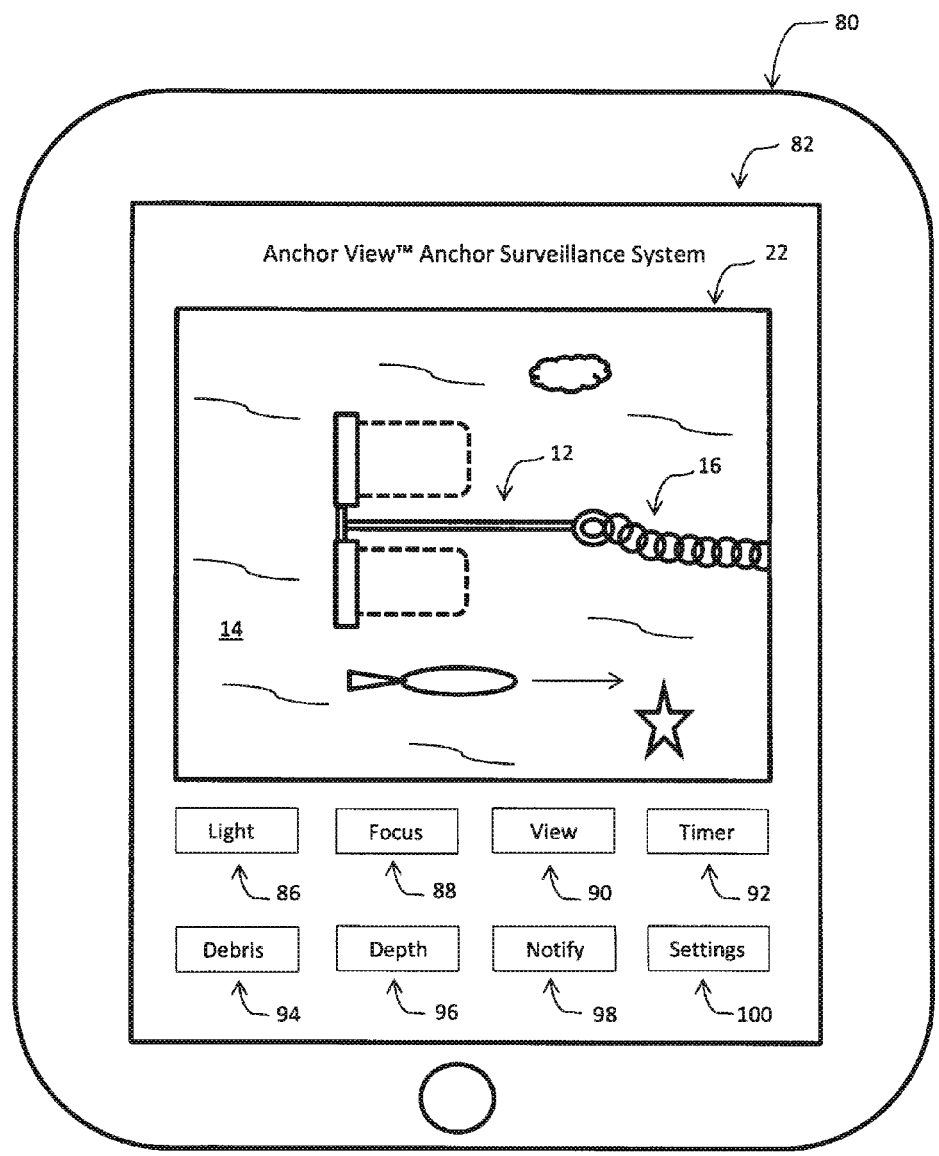
FIG. 25 is a top view of a computer tablet with an exemplary version of the Anchor View app initiated, with a video display of an anchor and a variety of optional touch-screen buttons to help control functionality of various components used to perform anchor surveillance according to the present invention.

Once initiated, the screen 82 will transition to the view shown in FIG. 25, including video display 22 and optionally a number of touch-screen buttons to control a variety of functions of the anchor surveillance system. The video display 22 transmits the video images from the video camera system 18 so that a viewer can remotely (i.e. on and/or off the maritime vessel 10) assess the purchase of the anchor 12 in the floor 14. If the video images are indicative of an anchor problem (e.g. the anchor 12 is dragging) or otherwise of concern, remedial steps may be undertaken or commissioned by the viewer to re-deploy or re-set the anchor to alleviate the anchor problem or concern.

The touch-screen buttons may include Light 86, Focus 88, View 90, Timer 92, Debris 94, Depth 96, Notify 98 and Settings 100. Although each will be described in greater detail below, it will be appreciated that these touch-screen buttons are set forth by way of example only and that any number of touch-screen buttons and/or the choices within each touch-screen button may be added, removed, and/or consolidated to vary the functionality described below and control less or more of the anchor surveillance system.

Figure 26:
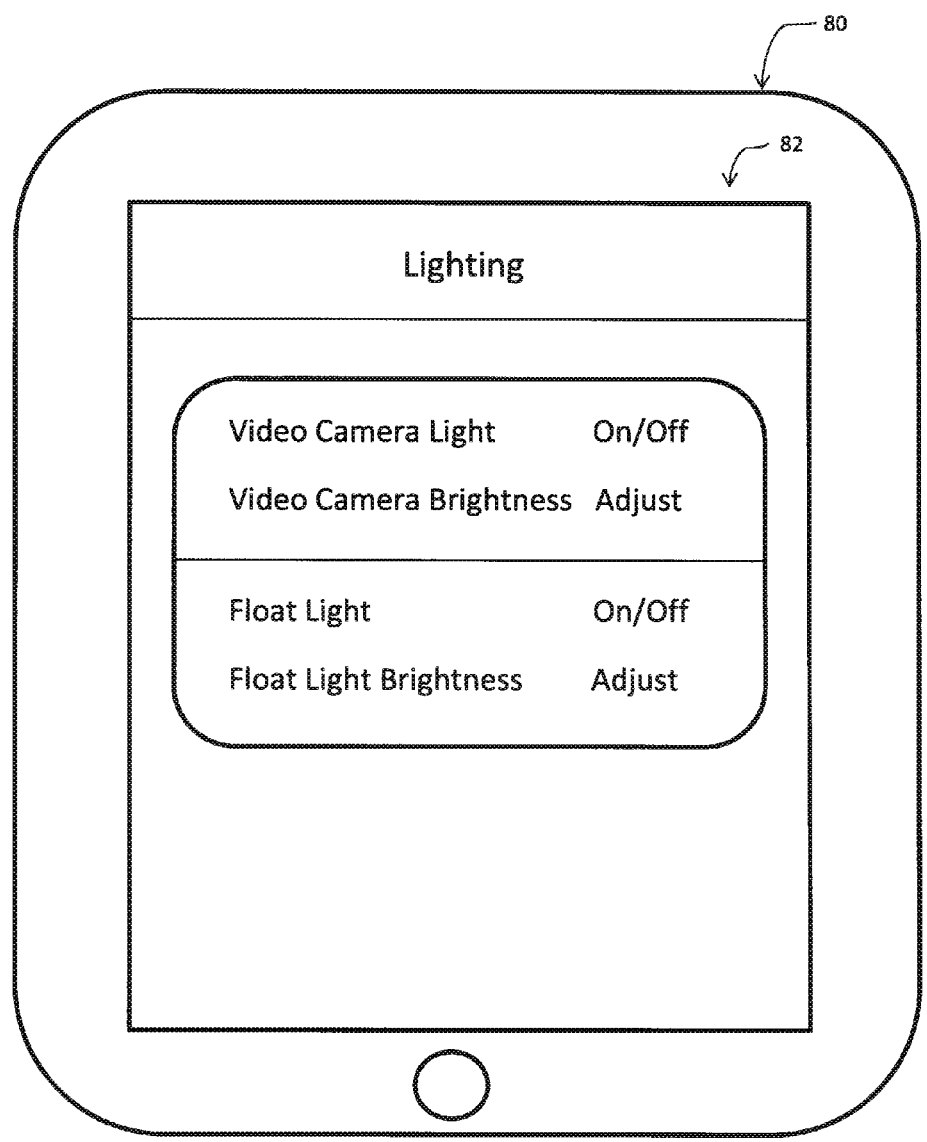
FIG. 26 is a top view of a computer tablet after the Light touch-screen button from FIG. 25 has been initiated, illustrating various Lighting choices according to an aspect of the present invention.

If a user taps on the Light touch-screen button 86, the screen 82 will transition to the view shown in FIG. 26 and set forth various Lighting choices. By way of example only, these Lighting choices are for a light (e.g. light source 21) associated with the video camera system 18 and a light (e.g. light 43) associated with a float (e.g. communications module 30) coupled to the video camera 18. According to one aspect, the Lighting choices include Video Camera Light—On/Off, Video Camera Light Brightness—Adjust, Float Light—On/

Off, and Float Light Brightness—Adjust, to control those aspects of functionality via Anchor app 78.

Figure 27:
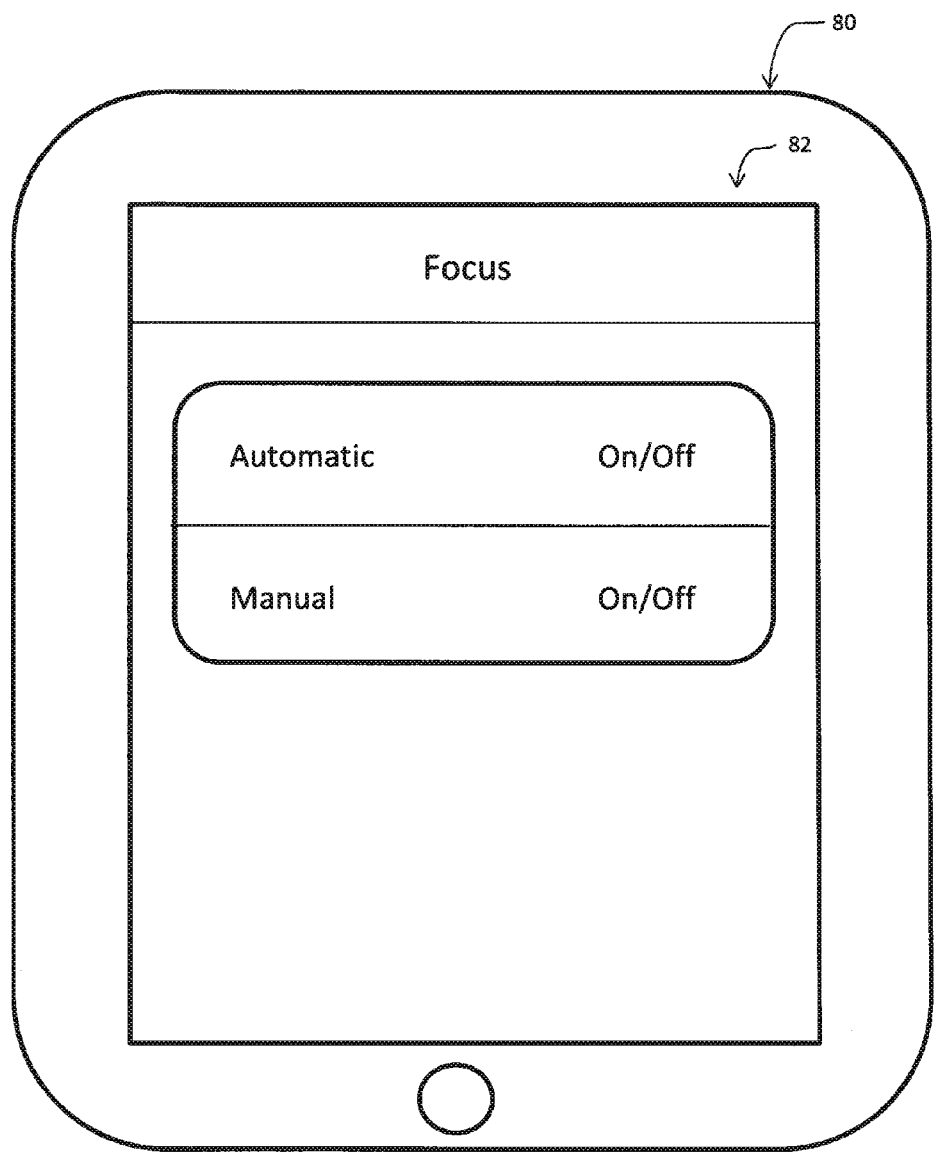
FIG. 27 is a top view of a computer tablet after the Focus touch-screen button from FIG. 25 has been initiated, illustrating various Focus choices according to an aspect of the present invention.

If a user taps on the Focus touch-screen button 88, the screen 82 will transition to the view shown in FIG. 27 and set forth various Focus choices. By way of example only, these Focus choices are for the video camera 18. According to one aspect, the Focus choices include Automatic Focus—On/Off and Manual Focus—On/Off, to control those aspects of functionality via Anchor app 78.

Figure 28:
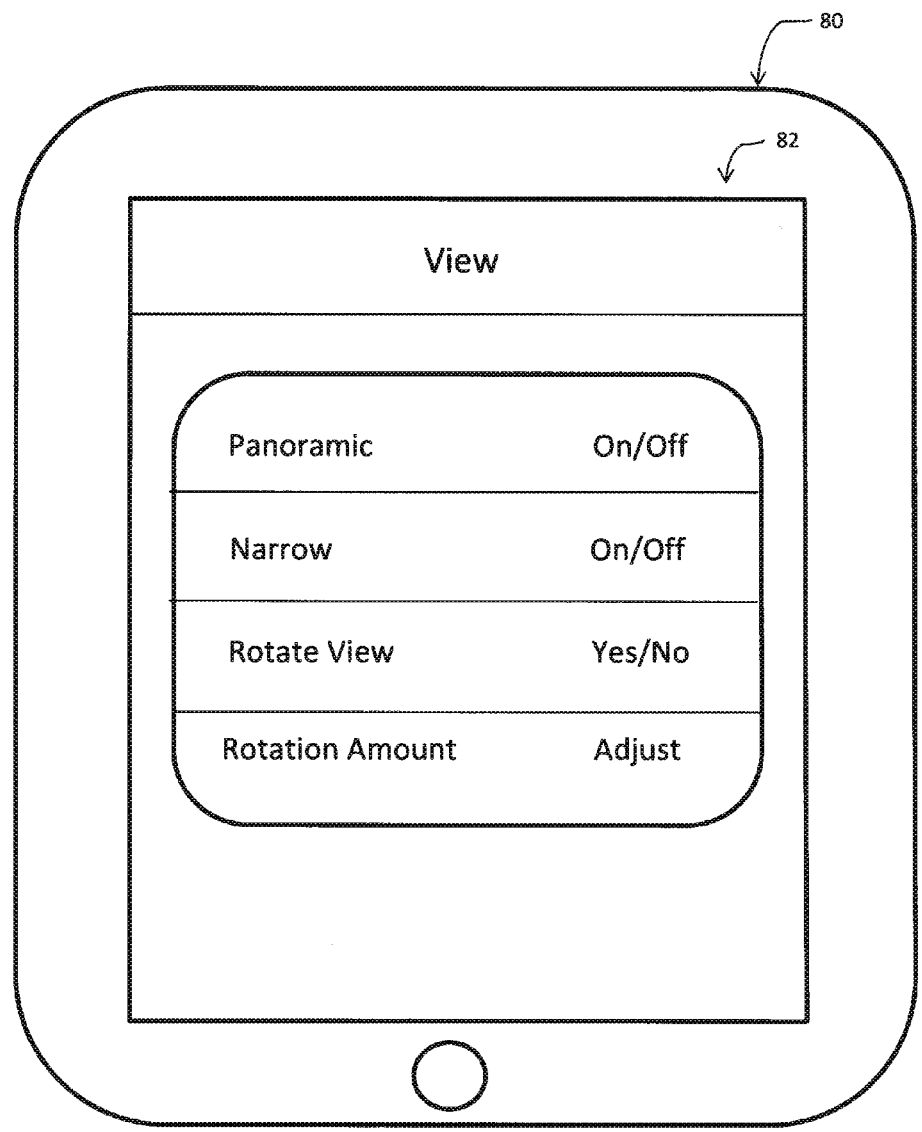
FIG. 28 is a top view of a computer tablet after the View touch-screen button from FIG. 25 has been initiated, illustrating various View choices according to an aspect of the present invention.

If a user taps on the View touch-screen button 90, the screen 82 will transition to the view shown in FIG. 28 and set forth various View choices. By way of example only, these View choices are for the video camera 18. According to one aspect, the View choices include Panoramic—On/Off, Narrow—On/Off, Rotate View—Yes/No, and Rotation Amount—Adjust, to control those aspects of functionality via Anchor app 78.

Figure 29:
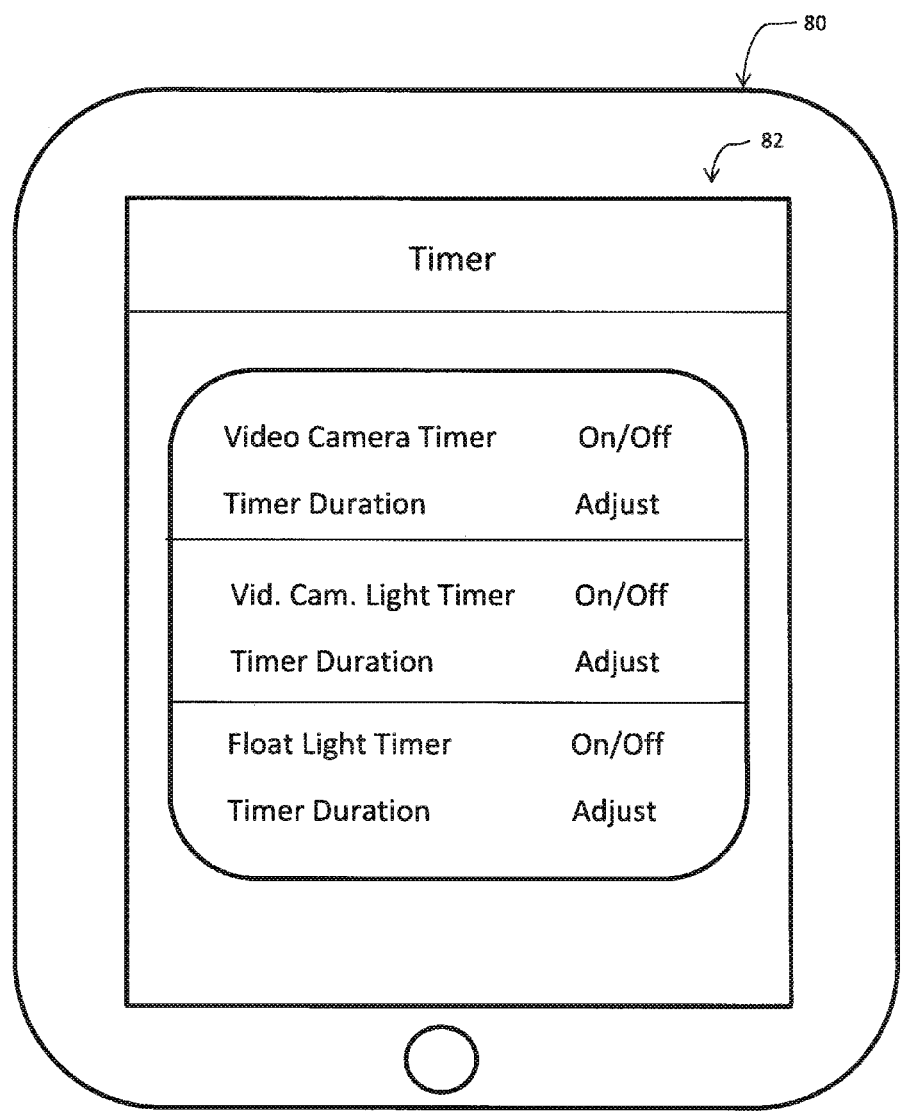
FIG. 29 is a top view of a computer tablet after the Timer touch-screen button from FIG. 25 has been initiated, illustrating various Timer choices according to an aspect of the present invention.

If a user taps on the Timer touch-screen button 92, the screen 82 will transition to the view shown in FIG. 29 and set forth various Timer choices. By way of example only, these Timer choices are for a timer associated with the video camera 18, a timer associated with a video camera light (e.g. light source 21), and a timer associated with a float (e.g. communications module 30) coupled to the video camera 18. According to one aspect, the Timer choices include Video Camera Timer—On/Off, Video Camera Timer Duration—Adjust, Video Camera Light Timer—On/Off, Video Camera Light Timer Duration—Adjust, Float Light Timer—On/Off, and Float Light Timer Duration—Adjust, to control those aspects of functionality via Anchor app 78.

Figure 30:
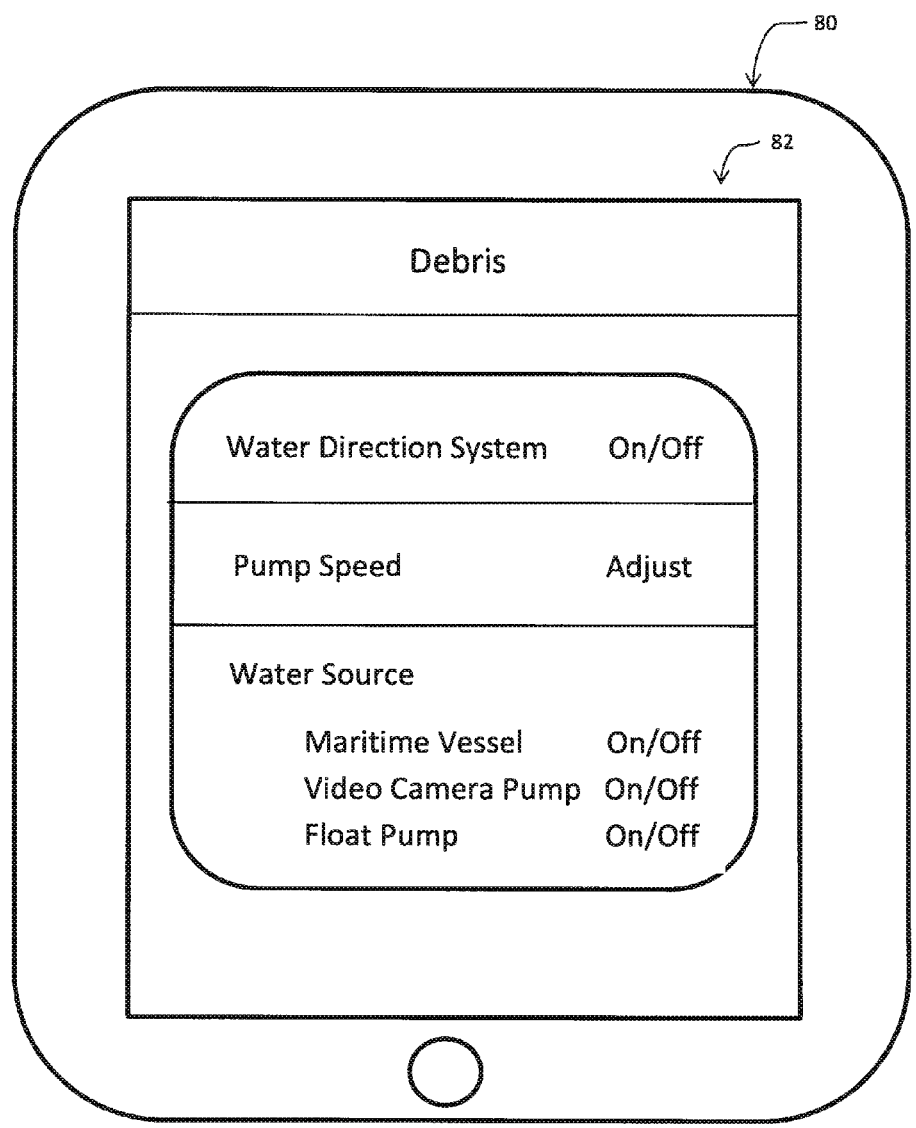
FIG. 30 is a top view of a computer tablet after the Debris touch-screen button from FIG. 25 has been initiated, illustrating various Debris choices according to an aspect of the present invention.

If a user taps on the Debris touch-screen button 94, the screen 82 will transition to the view shown in FIG. 30 and set forth various Debris choices. By way of example only, these Debris choices are for a water direction system (e.g. pump 70 and/or water hose 72) configured to aid in clearing or moving debris away from around the anchor 12 in order to enhance or improve the ability to view the anchor 12 via the video display 22. According to one aspect, the Debris choices include Water Direction System—On/Off, Pump Speed—Adjust, Water Source=Maritime Vessel—On/Off, Water Source=Video Camera Pump—On/Off, and Water Source=Float Pump—On/Off, to control those aspects of functionality via Anchor app 78.

Figure 31:
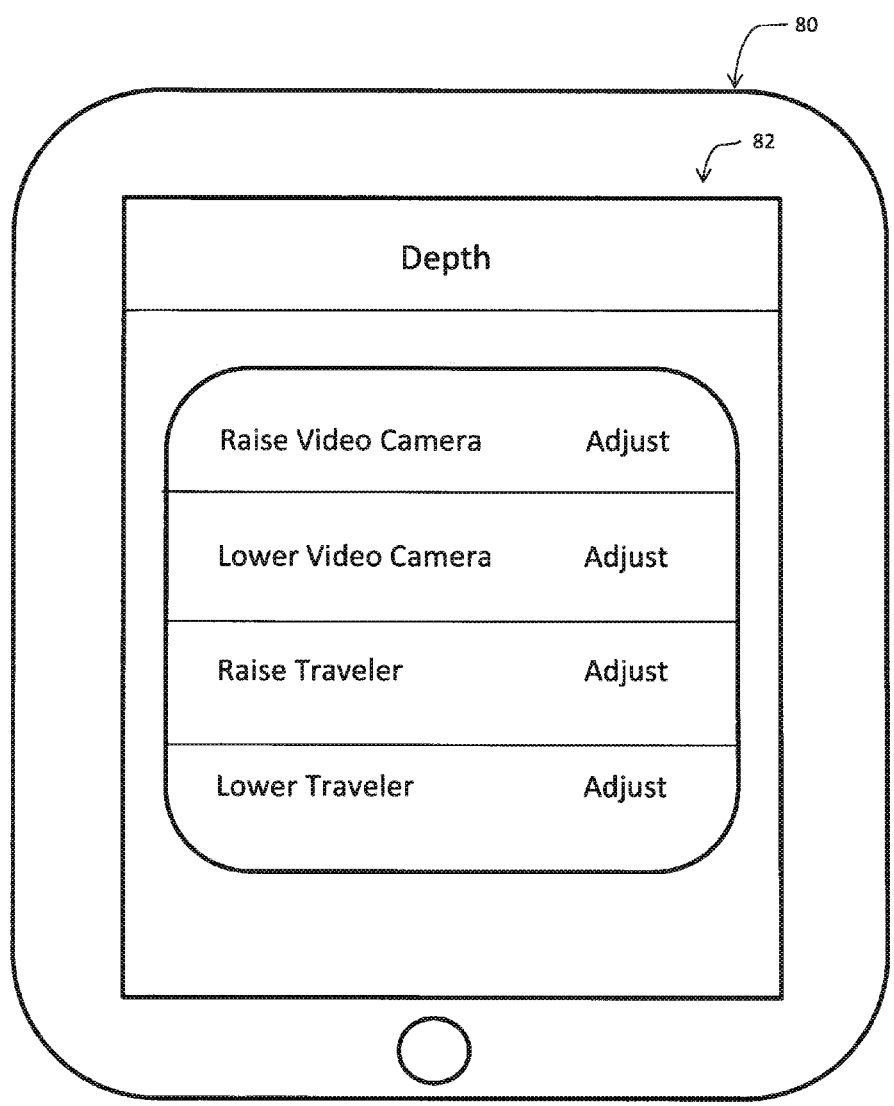
FIG. 31 is a top view of a computer tablet after the Depth touch-screen button from FIG. 25 has been initiated, illustrating various Depth choices according to an aspect of the present invention.

If a user taps on the Depth touch-screen button 96, the screen 82 will transition to the view shown in FIG. 31 and set forth various Depth choices. By way of example only, these Depth choices are for the video camera 18 and/or traveler system 36 for the purpose of varying the depth of the video camera 18 relative to the anchor 12. According to one aspect, the Depth choices include Raise Video Camera—Adjust, Lower Video Camera—Adjust, Raise Traveler—Adjust, and Lower Traveler—Adjust, to control those aspects of functionality via Anchor app 78. As noted above, one manner of raising and lowering the video camera 18 is to effectively lengthen or shorten, respectively, the tether 24 such as by equipping the housing 25 of the video camera system 18 with a spool assembly (not shown) for selectively paying out and retracting, respectively, the tether 24 from or into the housing 25.

Figure 32:
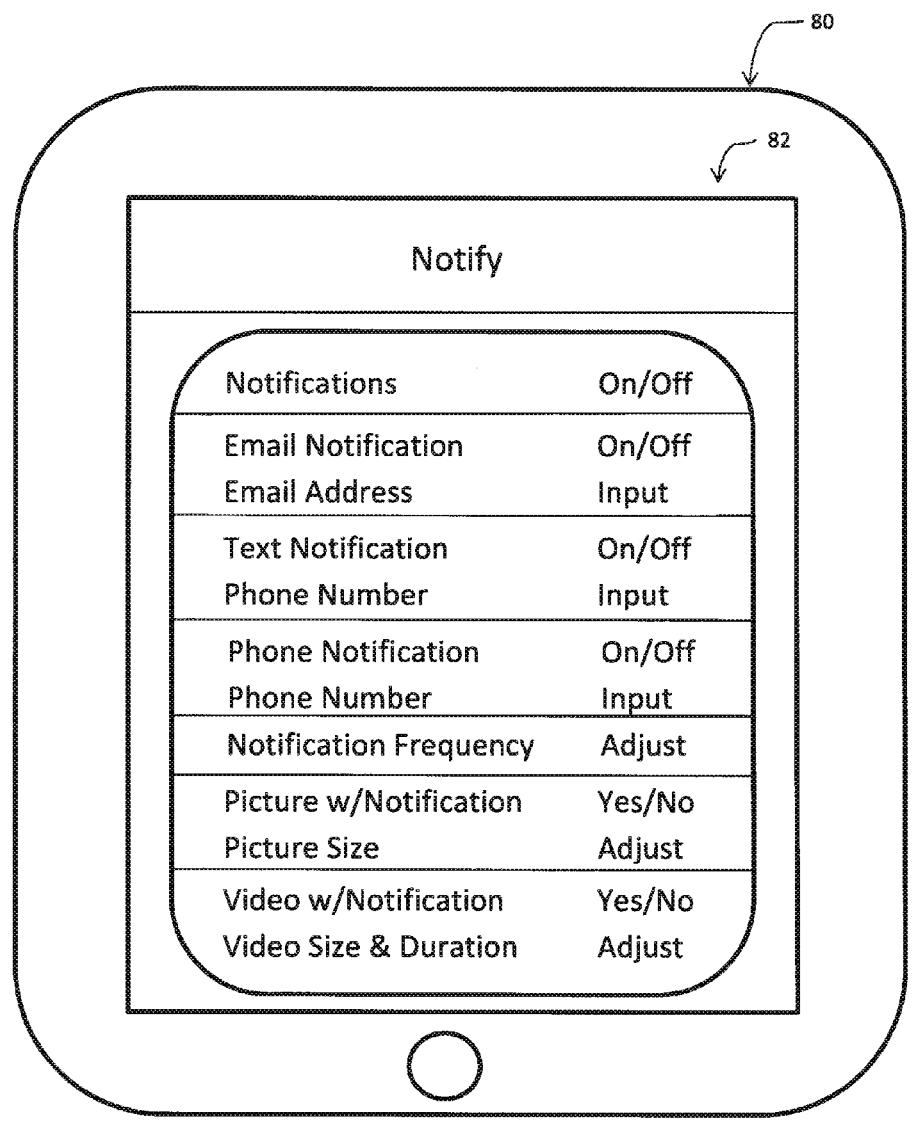
FIG. 32 is a top view of a computer tablet after the Notify touch-screen button from FIG. 25 has been initiated, illustrating various Notification choices according to an aspect of the present invention.

If a user taps on the Notify touch-screen button 98, the screen 82 will transition to the view shown in FIG. 32 and set forth various Notification choices. By way of example only, these Notification choices are for sending notifications and/or alarms to a user regarding aspects of the anchor surveillance system. According to one aspect, the Notification choices include Notifications—On/Off, Email Notification—On/Off, Email Address—Input, Text Notification—On/Off, Text Phone Number—Input, Phone Notification—On/Off, Phone Notification Phone Number—Input, Notification Frequency—Adjust, Picture with Notification—Yes/No, Picture Size—Adjust, Video with Notification—Yes/No, Video Size—Adjust, and Video Duration—Adjust, to control those aspects of functionality via Anchor app 78.

Figure 33:
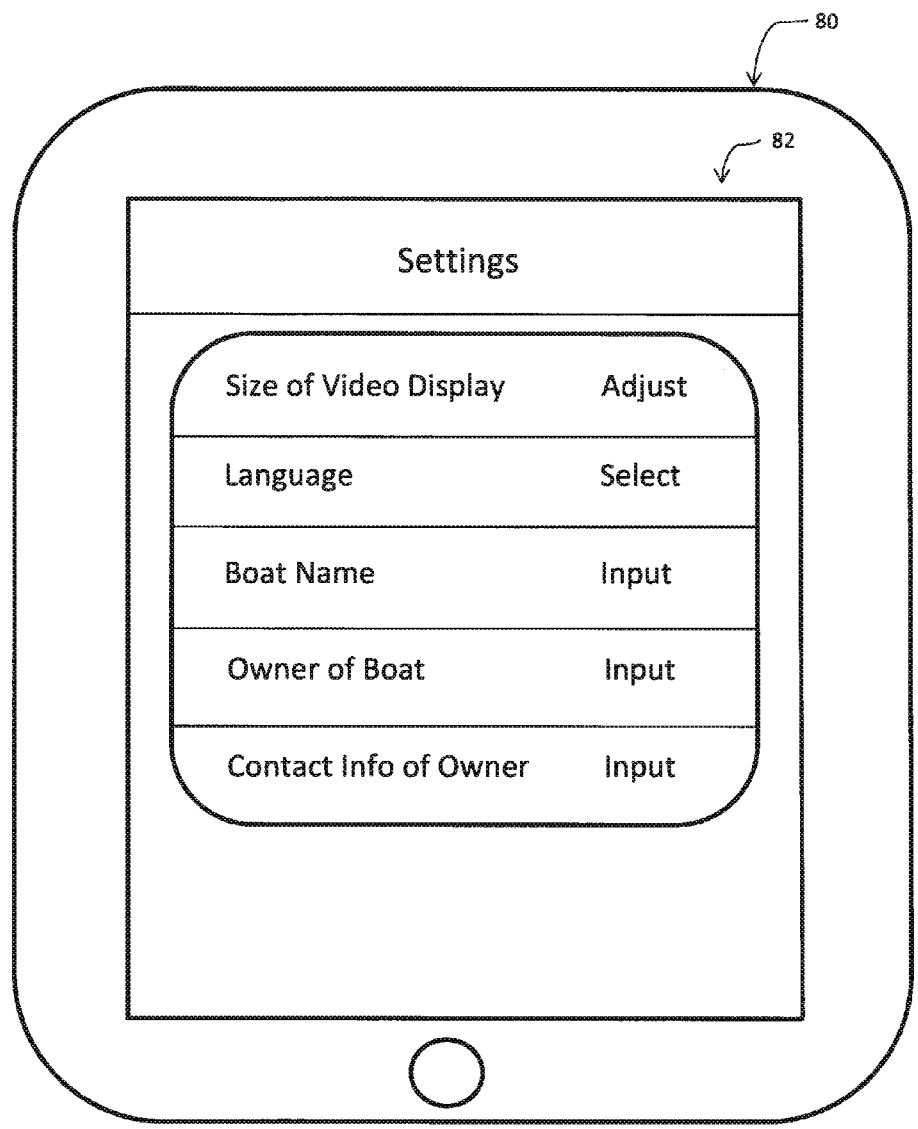
FIG. 33 is a top view of a computer tablet after the Settings touch-screen button from FIG. 25 has been initiated, illustrating various Settings choices according to an aspect of the present invention.

If a user taps on the Settings touch-screen button 100, the screen 82 will transition to the view shown in FIG. 33 and set forth various Settings choices. By way of example only, these Settings choices are for the video display 22 and other aspects of the anchor surveillance system. According to one aspect, the Settings choices include Size of Video Display—Adjust, Language—Select, Boat Name—Input, Owner of Boat—Input, and Contact Info of Owner, to control those aspects of functionality via Anchor app 78.

As was stated above, the Anchor app 78 may be modified in any of a variety of ways without departing from the present invention. For example, the functionality within each of the touch-screen buttons 86-100 may be re-organized into different touch-screen buttons. One manner of re-organizing would involve categorizing all functionality pertaining to the video camera under a "Video Camera" touch-screen button, categorizing all functionality pertaining to the coupling mechanisms under a "Coupling Mechanism" touch-screen button, categorizing all functionality pertaining to the video display under a "Video Display" touch-screen button, and categorizing all functionality pertaining debris management (e.g. pump 70 and/or water hose 72) into a "Debris" touch-screen button.

As evidenced by the foregoing, the anchor surveillance systems and related methods of the present invention address the long felt need of ensuring adequate anchor purchase to safely and securely maintain a maritime vessel in a given anchor location. By capturing video images of an anchor and transmitting them to a remote video display located on-vessel and/or off-vessel, the anchor surveillance systems of the present invention provides the ability to perform indirect visual inspection an anchor to ensure proper purchase in the sea or lake floor. The anchor surveillance systems of the present invention thus avoid the need to perform direct visual inspection, which is particularly advantageous when direct inspection (via diving) is not desired and/or possible (e.g. during inclement and/or dangerous conditions). Appropriate corrective action may be undertaken if the anchor purchase is deemed inadequate or otherwise of concern, such as re-deploying or re-setting the anchor, which increases the safety of the maritime vessel, nearby vessels, and those on shore in the vicinity of the maritime vessel.

Any of the features or attributes of the above the above described embodiments and variations can be used in combination with any of the other features and attributes of the above described embodiments and variations as desired. Various modifications, additions and other alternative embodiments are possible without departing from the true scope and spirit. The embodiments presented herein were chosen and described to provide an illustration of various principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An anchor surveillance system for maritime vessels, comprising:
   a video camera for capturing video images of an anchor of
      a maritime vessel while said anchor is at least one of deployed to and set in a floor of a body of water on which said maritime vessel floats, wherein said video camera is configured to float generally above said anchor and transmit said video images of said anchor to a video display such that a viewer of said video display may be informed as to the purchase of said anchor; and a coupling system for coupling said video camera to at least one of said anchor and an anchor rode connected to said anchor such that said video camera is in generally close proximity to said anchor.

2. The system of claim 1, wherein said video camera includes a light for illuminating an area around said anchor during the capture of said video images.

3. The system of claim 1, wherein said video camera at least one of includes and is coupled to at least one buoyant element to cause it to float generally above said anchor.

4. The system of claim 3, wherein said at least one buoyant element comprises at least one of air, cork, and Styrofoam disposed within a housing of said video camera.

5. The system of claim 3, wherein said at least one buoyant element comprises a float coupled to said video camera, said float including at least one of air, cork and Styrofoam.

6. The system of claim 5, wherein said float is configured to indicate the general location of said anchor via at least one of a light, a highly visible color, a luminescent coating, a light-reflective coating, and a global positioning system (GPS).

7. The system of claim 6, wherein the float comprises a floating communication module having on-board electronics capable of wirelessly transmitting said video images to said video display.

8. The system of claim 5, wherein said floating communication module includes at least one solar cell and at least one battery configured to at least partially power at least one of said light and said on-board electronics.

9. The system of claim 5, wherein said floating communication module is communicatively linked to said video camera via a cable and configured to float at or near the surface of the water.

10. The system of claim 9, wherein said floating communication module is retractably coupled to said video camera to maintain sufficient tension on said cable to maintain said video camera generally above said anchor.

11. The system of claim 1, wherein said video camera and said video display are communicatively linked via at least one of a wired and wireless transmission for transmitting said video images from said video camera to said video display.

12. The system of claim 1, wherein said coupling system comprises at least one of a tether, a clamp, and a link fixedly or movably coupled to at least one of said anchor and said anchor rode.

13. The system of claim 12, wherein said coupling system comprises a tether coupled to said anchor rode via a traveler, said traveler capable of traversing at least one of up and down said anchor rode in at least one of a manual and a mechanized manner.

14. The system of claim 12, wherein said coupling system comprises a proximal tether coupled to said video camera and a distal tether coupled to said video camera, wherein said proximal tether is capable of being connected to said anchor rode and said distal tether is capable of being connected to said anchor.

15. The system of claim 12, wherein said coupling system comprises at least one of a split-shell and a strut assembly, said split-shell containing said video camera and capable of being clamped over at least one of said anchor and said anchor rode, and said strut assembly having arms for selectively clamping onto said anchor.

16. The system of claim 1, wherein said video camera is configured to at least one of focus, adjust a direction of said video camera, adjust a light source associated with said video camera, and turn said video camera off and on at least one of manually and automatically via remote control.

17. The system of claim 1, further comprising a water directing system capable of directing water generally towards said anchor to clear debris in the vicinity of said anchor and enhance the ability to visualize said anchor via said video images.

18. The system of claim 1, further comprising at least one of a dedicated video display, a television, a computer, a smartphone and a computer tablet located at least one of on and off said maritime vessel each including a video display for viewing said video images of said anchor such that said video images inform a viewer of said video display as to the purchase of said anchor.

19. The system of claim 18, wherein at least one of said smart phone and said computer tablet are loaded with a computer software application configured to remotely perform at least one of:

select and implement lighting choices for at least one of a light associated with said video camera and a light associated with a float coupled to said video camera, said lighting choices including at least one of light on and off, and brightness adjustment;

select and implement focus choices for said video camera, said focus choices including at least one of automatic focus and manual focus select and implement view choices for adjusting a view of said video camera, said view choices including at least one of panorama, narrow, normal, rotate view, and amount of view rotation;

select and implement timer choices for a timer associated with said at least one of said video camera, a light associated with said video camera, and a light associated with a float coupled to said video camera, said timer choices including at least one of timer on and off, and duration adjustment;

select and implement debris clearing choices for a water direction system capable of directing water generally towards said anchor to clear debris in the vicinity of said anchor and enhance the ability to visualize said anchor via said video images, said debris clearing choices including at least one of water direction system on and off, speed adjustment of a pump associated with said water direction system, and water source selection to designate a water source for said pump;

select and implement depth choices for adjusting a depth of said video camera relative to said anchor, said depth choices including at least one of raise and lower;

select and implement notification choices for notifying a person about said anchor surveillance, said notification choices including at least one of notifications on and off, email notification on and off, email address input, text notification on and off, text number input, phone call notification on and off, phone call number input, notification frequency, picture with notification yes or no, picture size, video clip with notification yes or no, and at least one of size and duration of video clip; and select and implement setting choices for modifying at least one setting of said video display.

* * * * *

UNITED STATES PATENT AND TRADEMARK OFFICE
CERTIFICATE OF CORRECTION

PATENT NO. : 8,654,189 B1
APPLICATION NO. : 13/449674
DATED : February 18, 2014
INVENTOR(S) : Spangler et al.

It is certified that error appears in the above-identified patent and that said Letters Patent is hereby corrected as shown below:

IN THE CLAIMS:

Claim 8, line 1, change "claim 5" to --claim 7--.

Claim 9, line 1, change "claim 5" to --claim 7--.

Signed and Sealed this
Twenty-fourth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,654,189 B1  
APPLICATION NO. : 13/449674  
DATED : February 18, 2014  
INVENTOR(S) : Spangler et al.

Page 1 of 1

It is certified that error appears in the above-identified patent and that said Letters Patent is hereby corrected as shown below:

IN THE CLAIMS:

Col. 15, Claim 8, line 31, change "claim 5" to --claim 7--.

Col. 15, Claim 9, line 35, change "claim 5" to --claim 7--.

This certificate supersedes the Certificate of Correction issued June 24, 2014.

Signed and Sealed this  
Fifth Day of August, 2014

Michelle K. Lee  
*Deputy Director of the United States Patent and Trademark Office*